(12) United States Patent
Lee et al.

(10) Patent No.: US 10,278,163 B2
(45) Date of Patent: Apr. 30, 2019

(54) UPLINK DATA TRANSMISSION METHOD IN WIRELESS COMMUNICATION SYSTEM AND APPARATUS FOR THE SAME

(71) Applicant: LG ELECTRONICS INC., Seoul (KR)

(72) Inventors: Eunjong Lee, Seoul (KR); Jaehoon Chung, Seoul (KR); Genebeck Hahn, Seoul (KR); Jinmin Kim, Seoul (KR); Kukheon Choi, Seoul (KR); Kwangseok Noh, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 127 days.

(21) Appl. No.: 15/327,364

(22) PCT Filed: Jan. 15, 2015

(86) PCT No.: PCT/KR2015/000415
§ 371 (c)(1),
(2) Date: Jan. 18, 2017

(87) PCT Pub. No.: WO2016/010217
PCT Pub. Date: Jan. 21, 2016

(65) Prior Publication Data
US 2017/0188352 A1    Jun. 29, 2017

Related U.S. Application Data

(60) Provisional application No. 62/026,050, filed on Jul. 18, 2014.

(51) Int. Cl.
*H04W 72/04* (2009.01)
*H04L 1/18* (2006.01)
(Continued)

(52) U.S. Cl.
CPC .......... *H04W 72/0413* (2013.01); *H04L 1/18* (2013.01); *H04L 1/1812* (2013.01);
(Continued)

(58) Field of Classification Search
None
See application file for complete search history.

(56) References Cited

U.S. PATENT DOCUMENTS

| 2010/0260154 A1* | 10/2010 | Frank | G01S 5/10 370/336 |
| 2011/0263286 A1 | 10/2011 | Damnjanovic et al. | |

(Continued)

OTHER PUBLICATIONS

PCT International Application No. PCT/KR2015/000415, International Search Report dated Apr. 30, 2015, 2 pages.

(Continued)

*Primary Examiner* — Brandon M Renner
(74) *Attorney, Agent, or Firm* — Lee Hong Degerman Kang Waimey

(57) ABSTRACT

A method for transmitting uplink (UL) data requiring low latency in a wireless communication system according to the present invention, the method performed by a user equipment comprises transmitting contention PUSCH resource block (CPRB) indication information used for identifying a particular UE and/or particular data to an eNB; transmitting UL data to the eNB through CPRB resources of a contention based PUSCH (CP) zone; and receiving a hybrid automatic retransmit request (HARQ) response with respect to the UL data from the eNB through a physical hybrid ARQ indicator channel (PHICH).

9 Claims, 35 Drawing Sheets

| CPRB indicator value | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| CPRB index (N=4) | 0 | 1 | 2 | 3 | 0 | 1 | 2 | 3 | 0 | 1 | 2 | 3 | 0 | 1 | 2 | 3 |
| Cyclic Shift | 0 | 0 | 0 | 0 | 1 | 1 | 1 | 1 | 2 | 2 | 2 | 2 | 3 | 3 | 3 | 3 |

(51) Int. Cl.
*H04L 5/00* (2006.01)
*H04W 72/14* (2009.01)

(52) U.S. Cl.
CPC .......... *H04L 1/1854* (2013.01); *H04L 1/1861* (2013.01); *H04L 5/0053* (2013.01); *H04L 5/0094* (2013.01); *H04W 72/0446* (2013.01); *H04W 72/14* (2013.01); *H04L 5/001* (2013.01); *H04L 5/0023* (2013.01)

(56) References Cited

U.S. PATENT DOCUMENTS

| | | |
|---|---|---|
| 2012/0113938 A1 | 5/2012 | Larsson et al. |
| 2012/0182977 A1 | 7/2012 | Hooli et al. |
| 2012/0213196 A1 | 8/2012 | Chung et al. |
| 2012/0287877 A1 | 11/2012 | Han et al. |
| 2013/0034071 A1 | 2/2013 | Lee et al. |
| 2013/0163534 A1 | 6/2013 | Anderson et al. |
| 2013/0163535 A1* | 6/2013 | Anderson ............. H04W 72/04 370/329 |
| 2015/0003349 A1* | 1/2015 | Kim .................... H04W 72/042 370/329 |
| 2015/0295689 A1* | 10/2015 | Lee ........................ H04L 5/001 370/329 |

OTHER PUBLICATIONS

European Patent Office Application Serial No. 15822248.9, Search Report dated Jan. 26, 2018, 12 pages.

Mediatek, "Discussion on Operations of Contention-based Transmission", 3GPP TSG RAN WG2 Meeting #69bis, R2-102208, XP050422716, Apr. 2010, 6 pages.

* cited by examiner

[Figure 1]
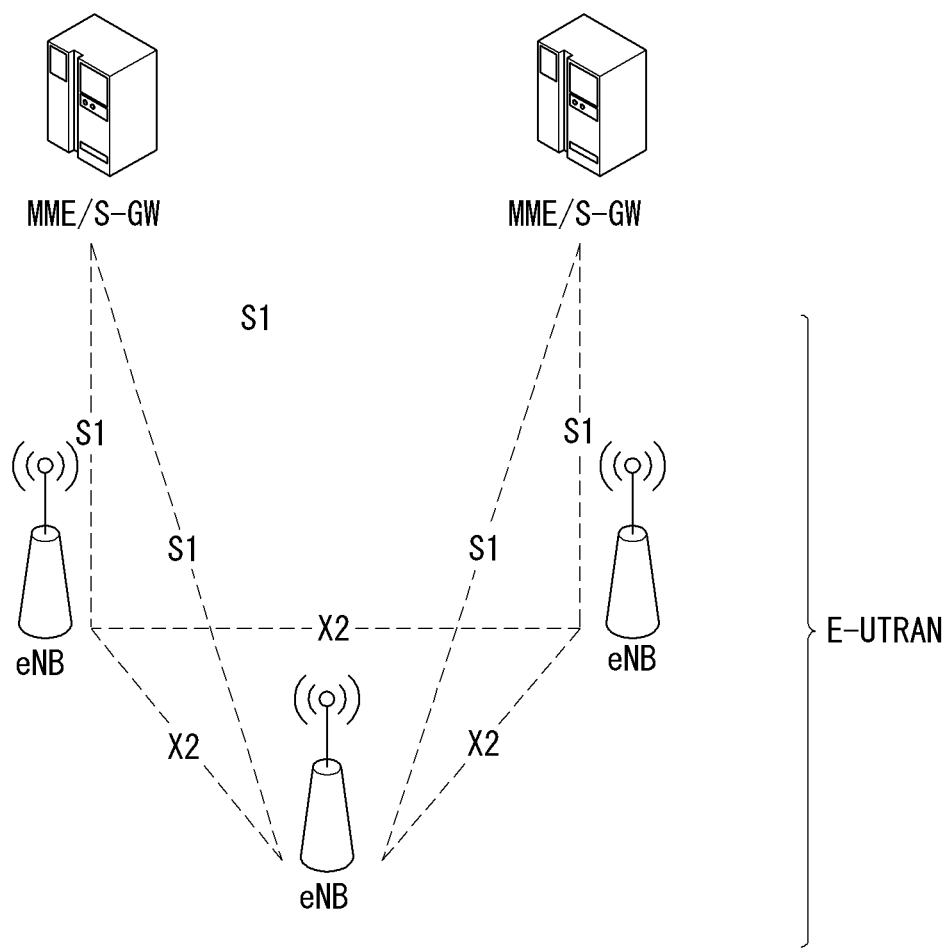

[Figure 2]
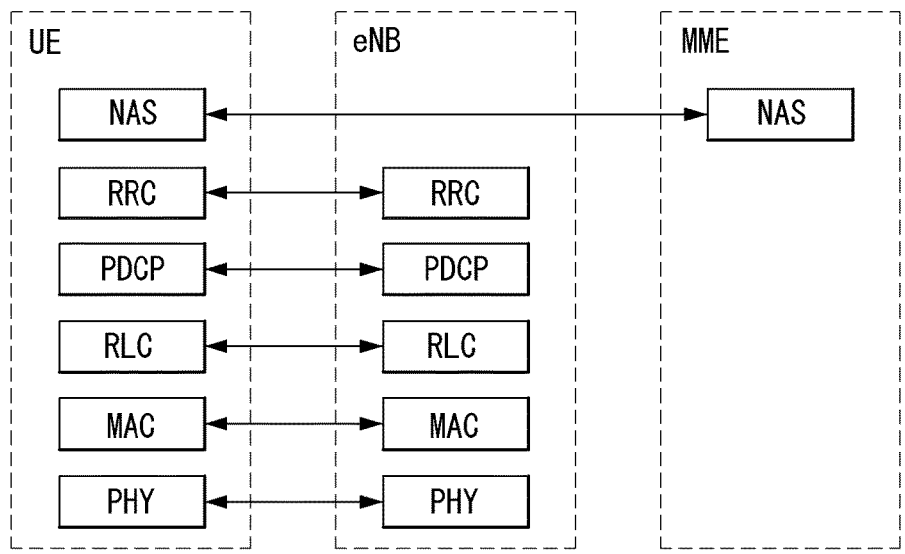
(a) Control plane protocol stack
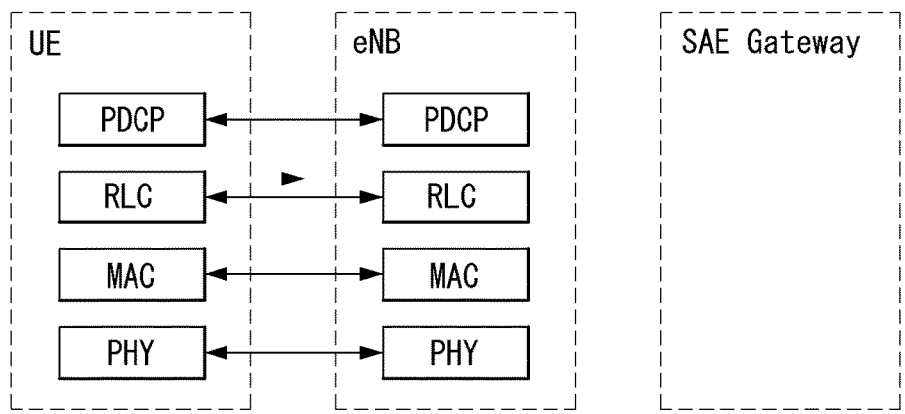
(b) User plane protocol stack

[Figure 3]
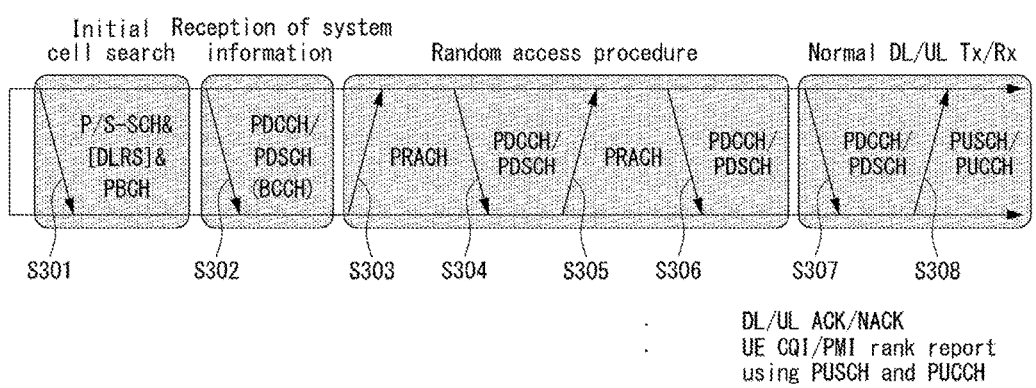

[Figure 4]
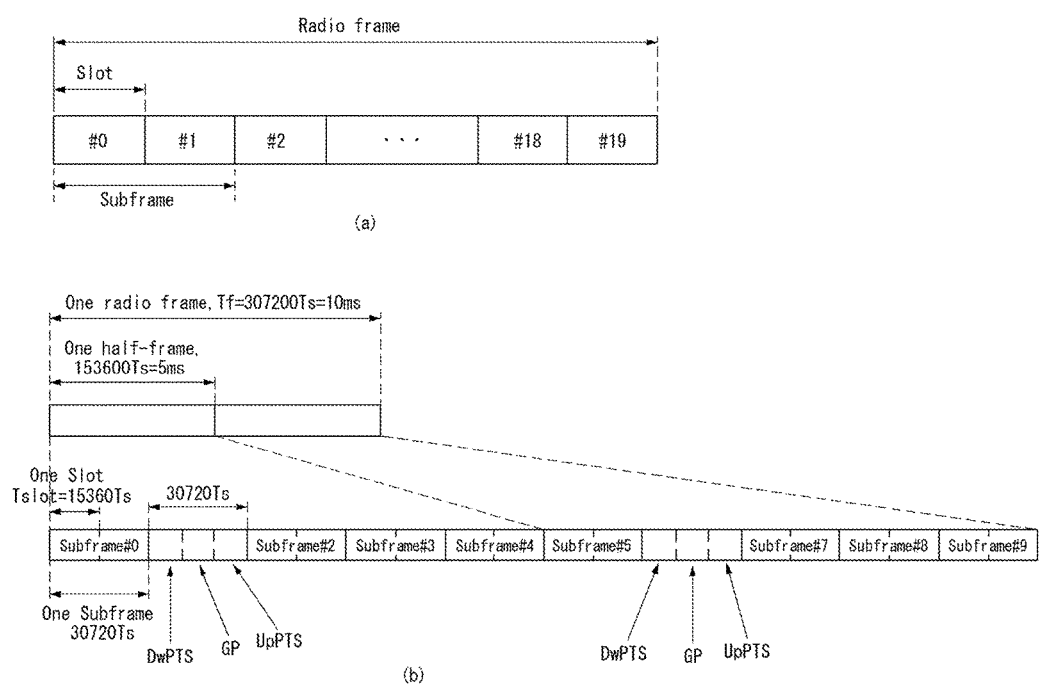

[Figure 5]
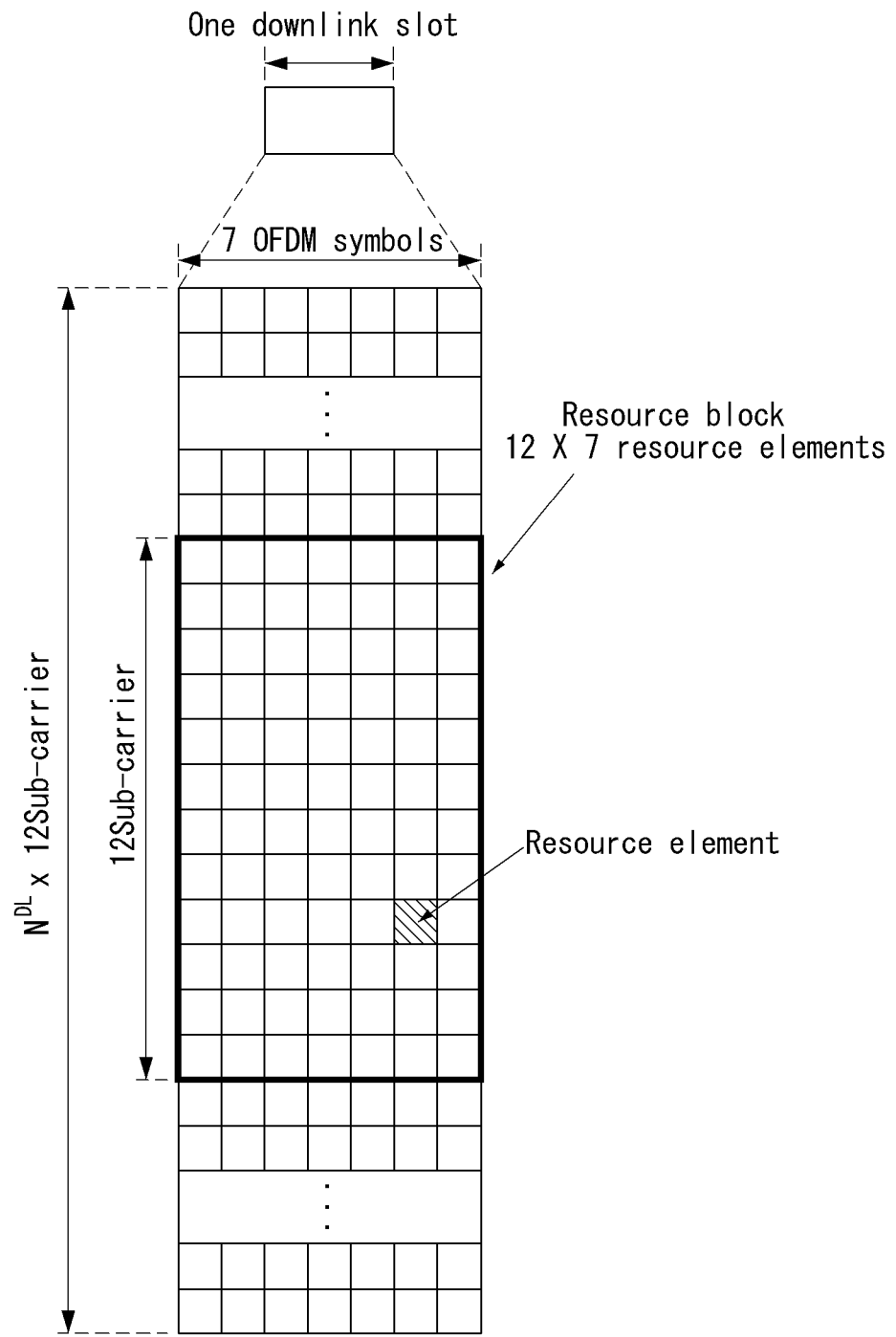

[Figure 6]
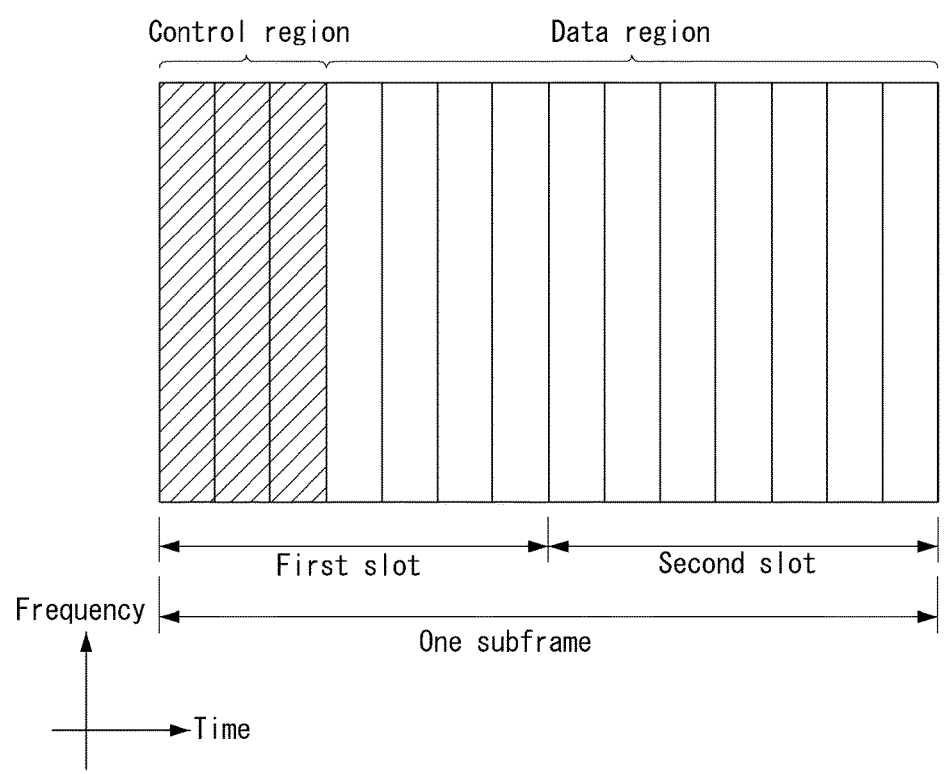

【Figure 7】
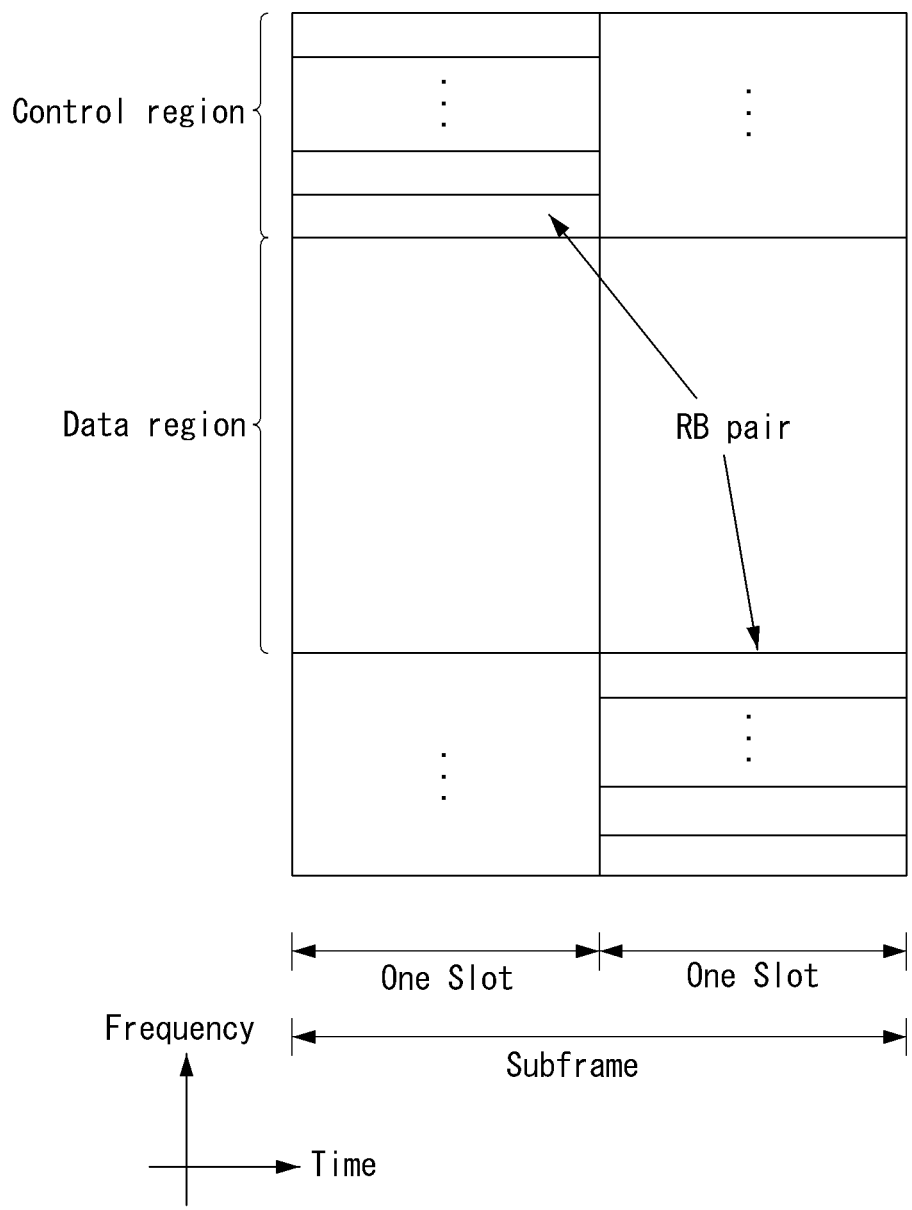

[Figure 8]

| CIF(3) | 0/1A | FH | Resource block assignment | MCS/RV (5) | NDI | TPC(2) | DM RS CS(3) | DAI(2) | CQI req. | SRS | RAT |

[Figure 9]
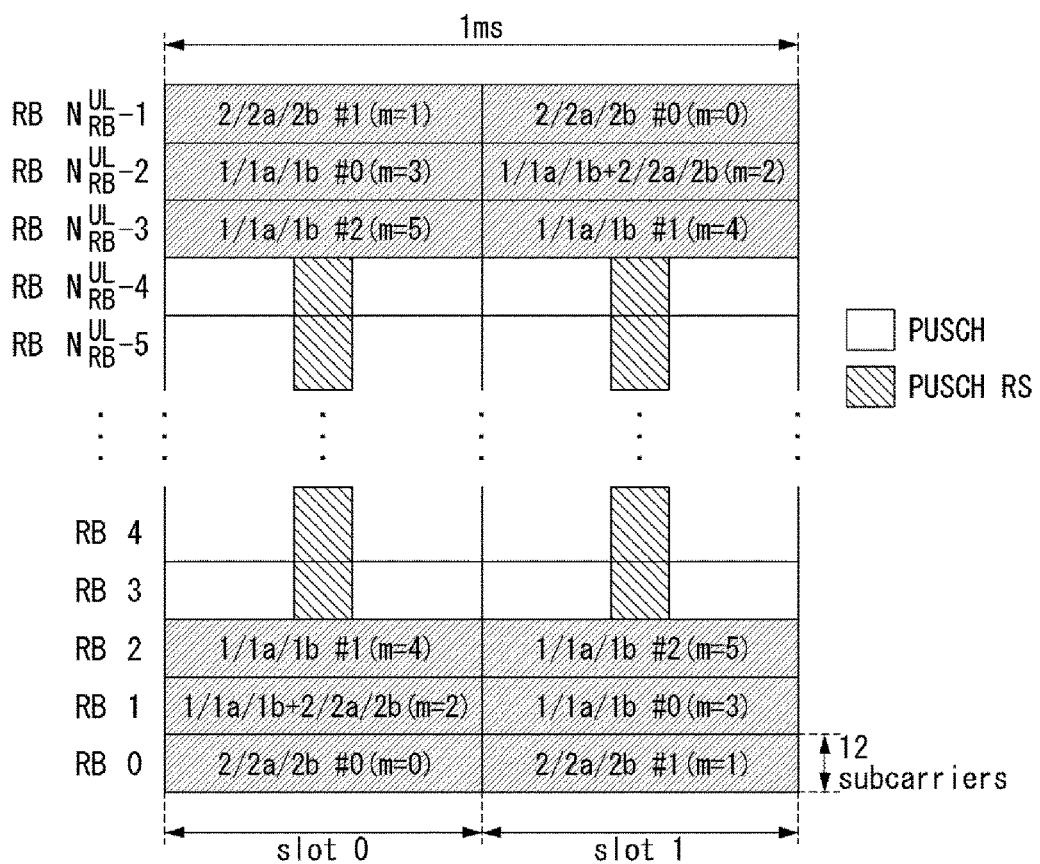

【Figure 10】
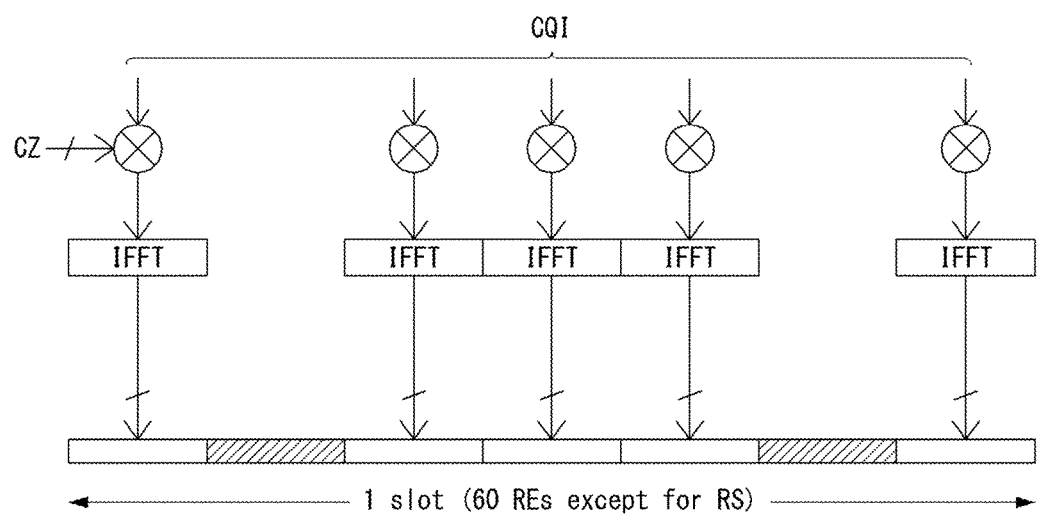

[Figure 11]
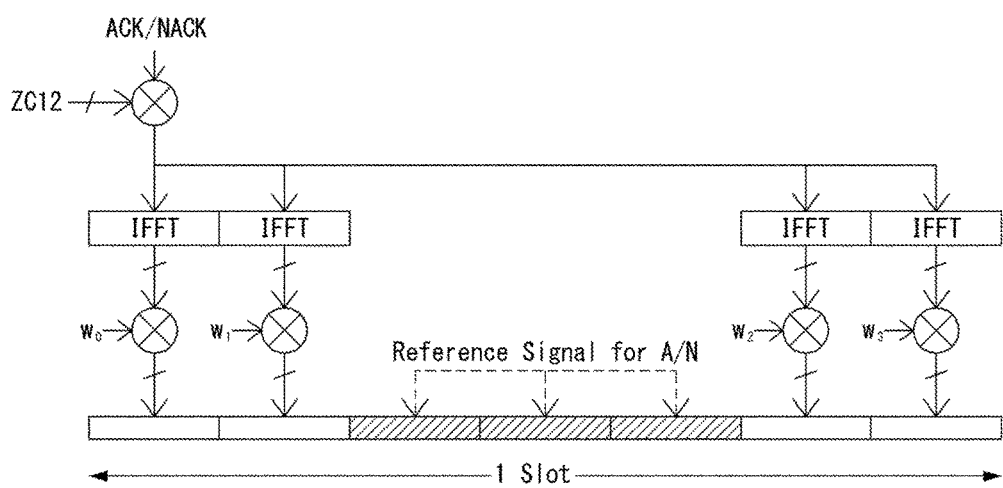

[Figure 12]
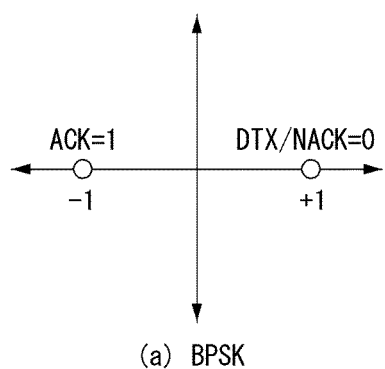
(a) BPSK
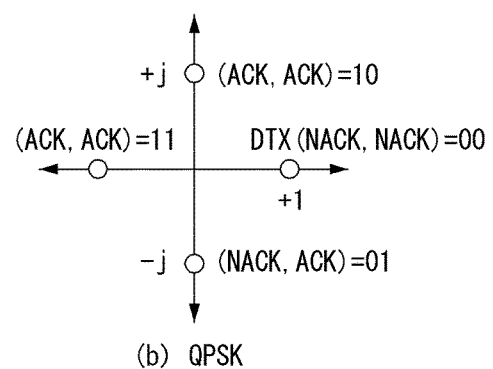
(b) QPSK

[Figure 13]
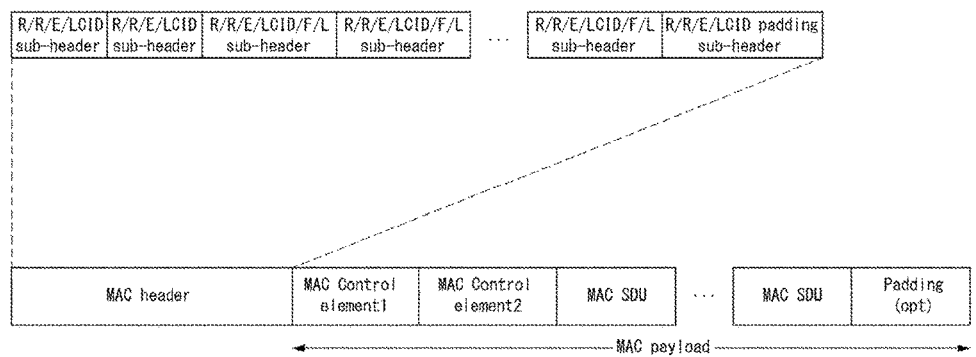

[Figure 14]
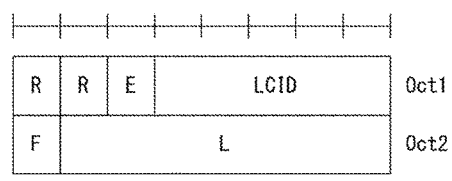
(a) R/R/E/LCID/F/L sub-header with
7-bit L field
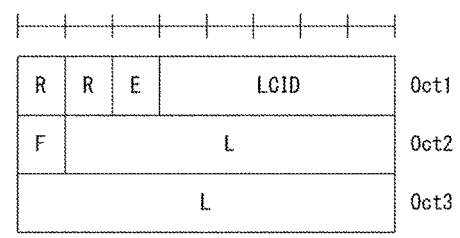
(b) R/R/E/LCID/F/L sub-header with
15-bit L field 【Figure 15】
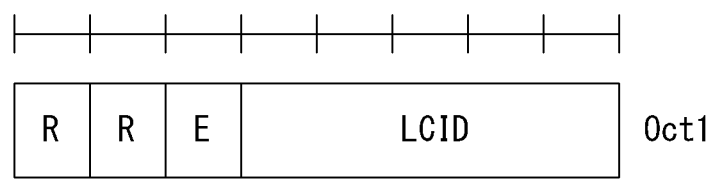
R/R/E/LCID sub-header

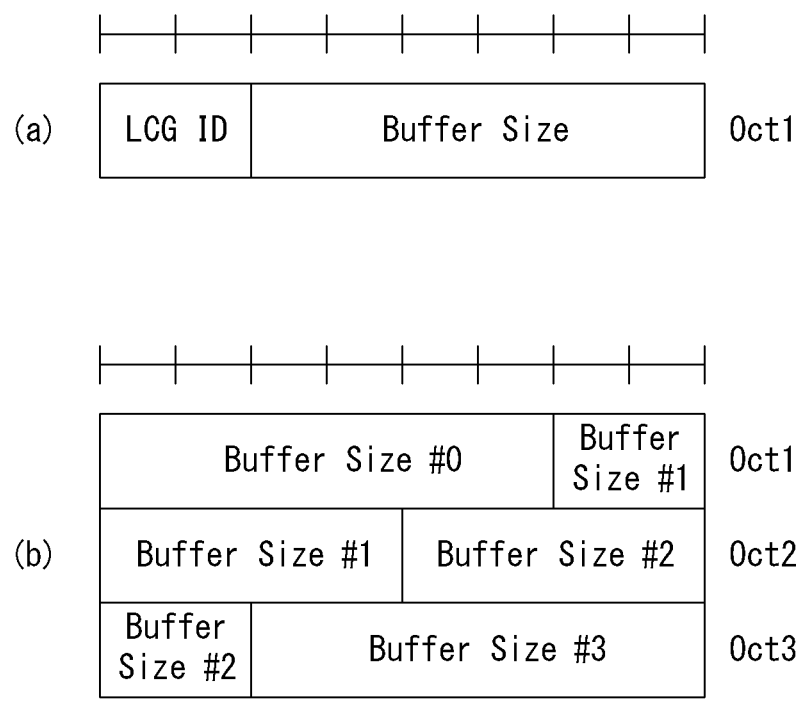
[Figure 16]

【Figure 17】
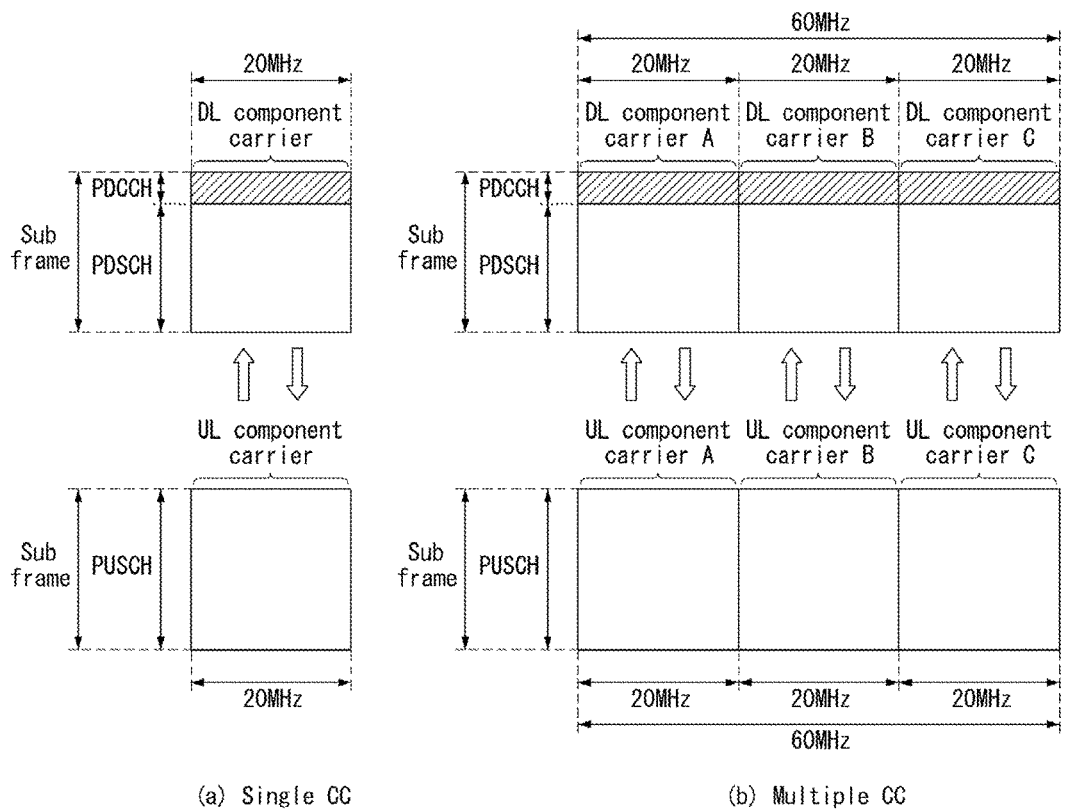
(a) Single CC
(b) Multiple CC

[Figure 18]
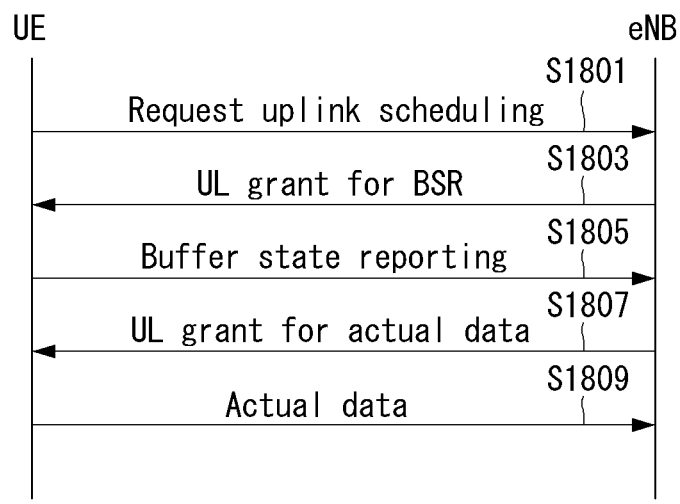
(a)
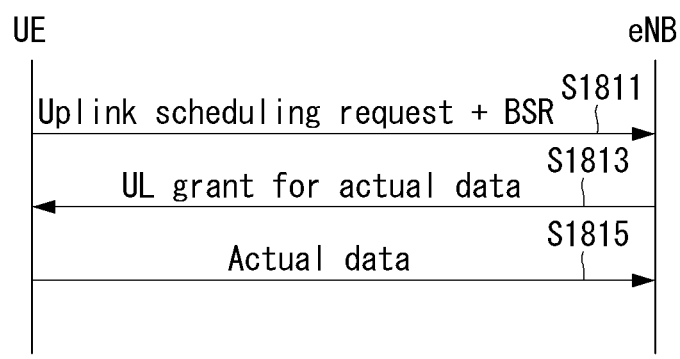
(b)

【Figure 19】
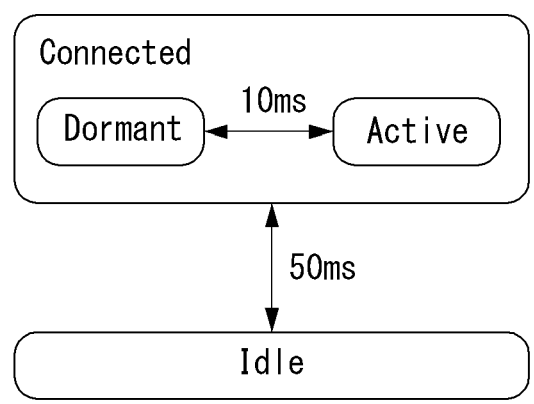

【Figure 20】
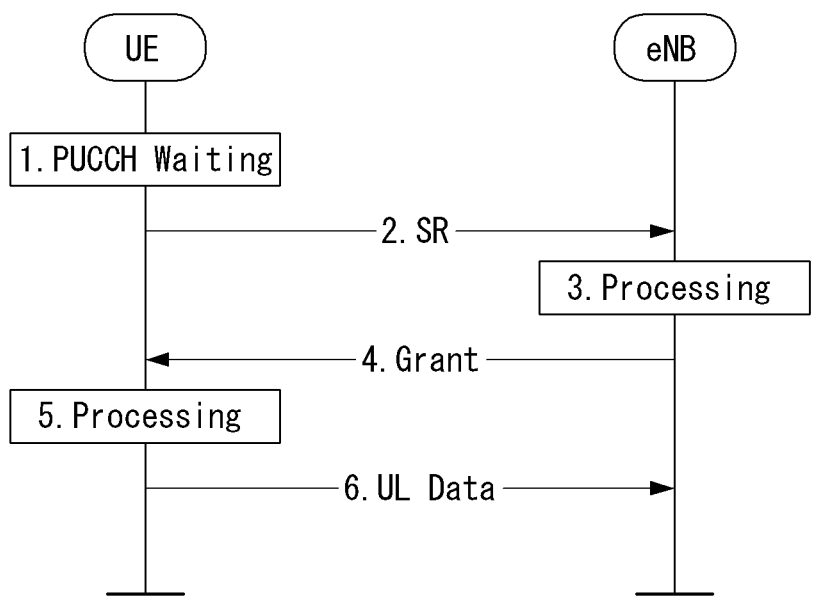

[Figure 21]
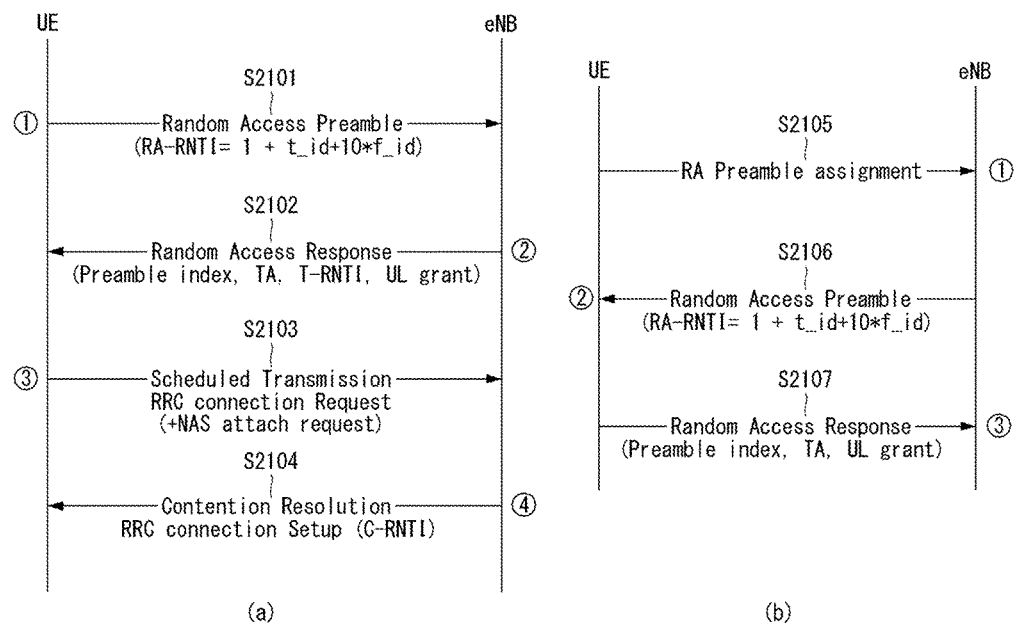

【Figure 22】
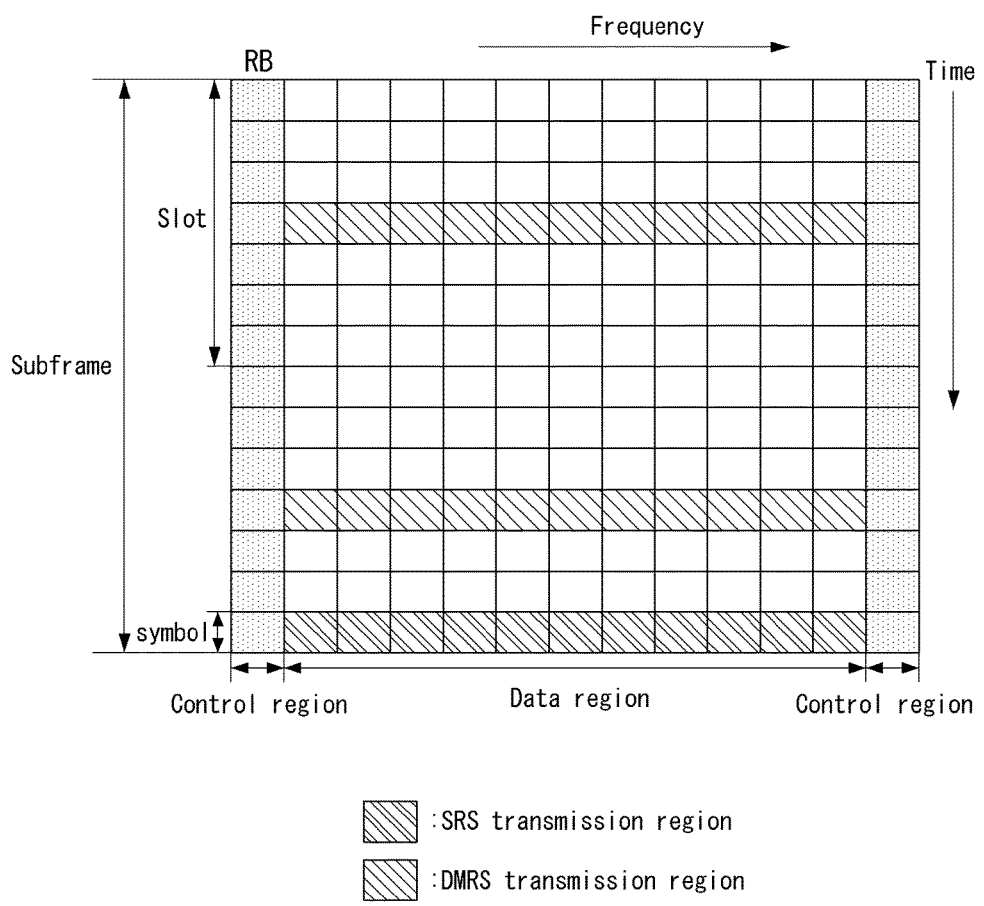

【Figure 23】
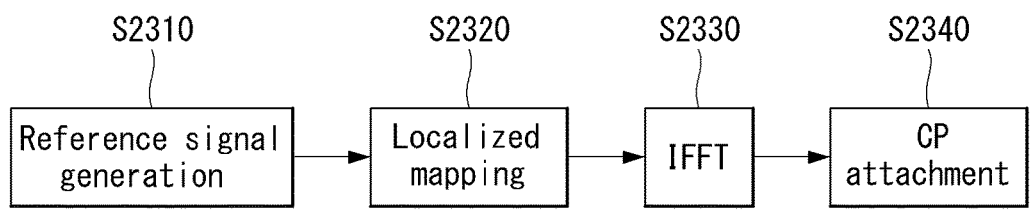

【Figure 24】
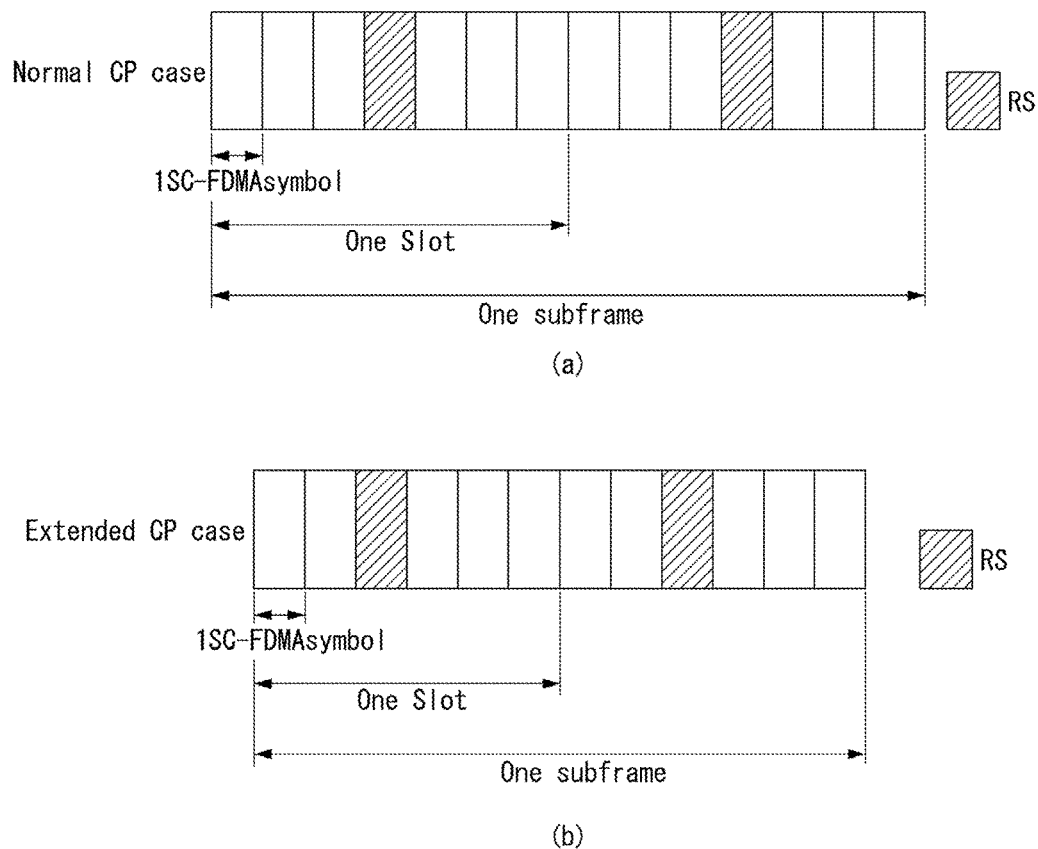

[Figure 25]
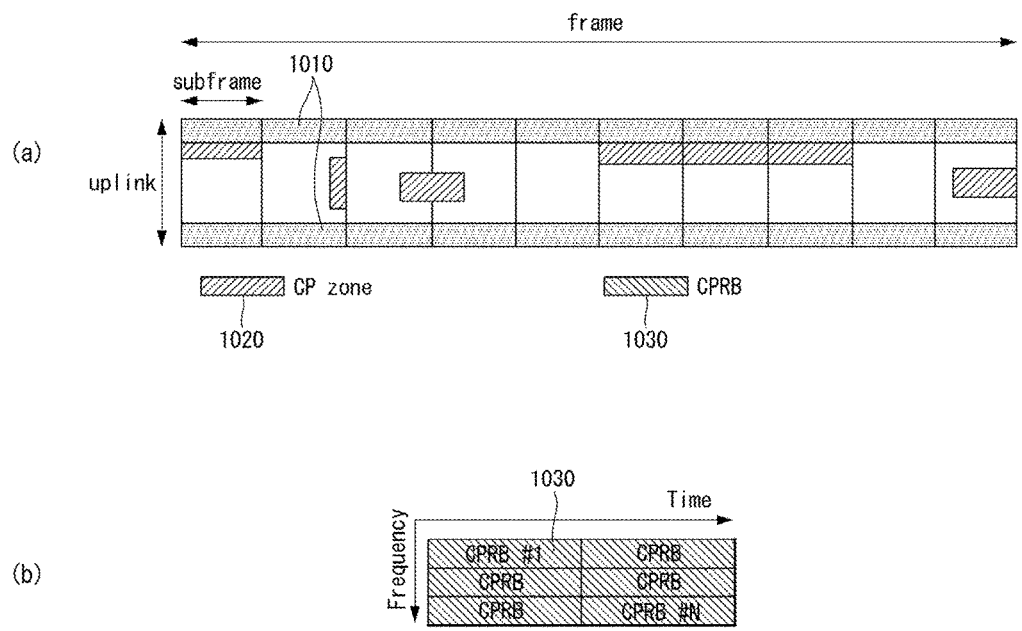

[Figure 26]
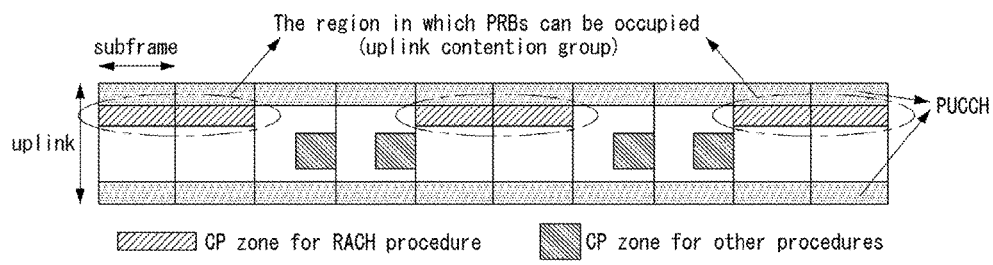

[Figure 27]
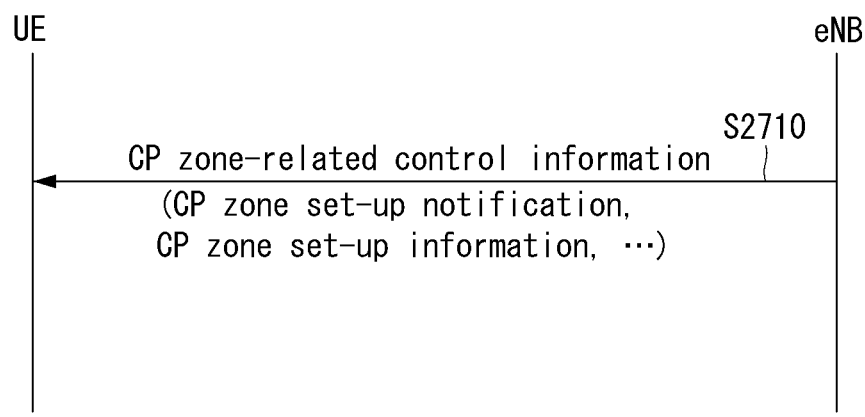

[Figure 28]
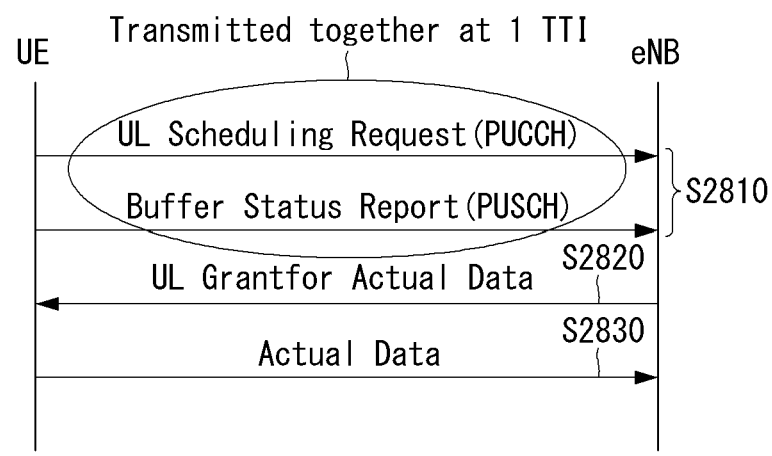

[Figure 29]
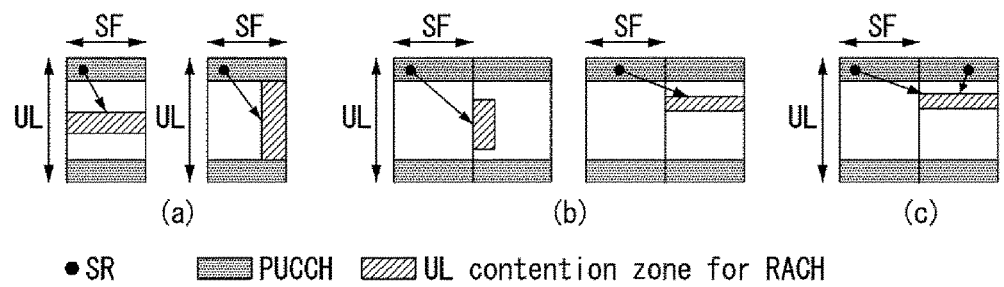

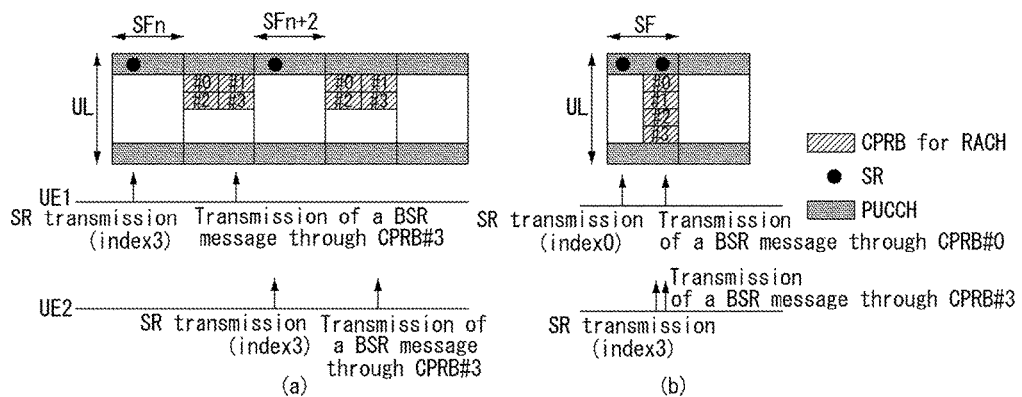
[Figure 30]

[Figure 31]
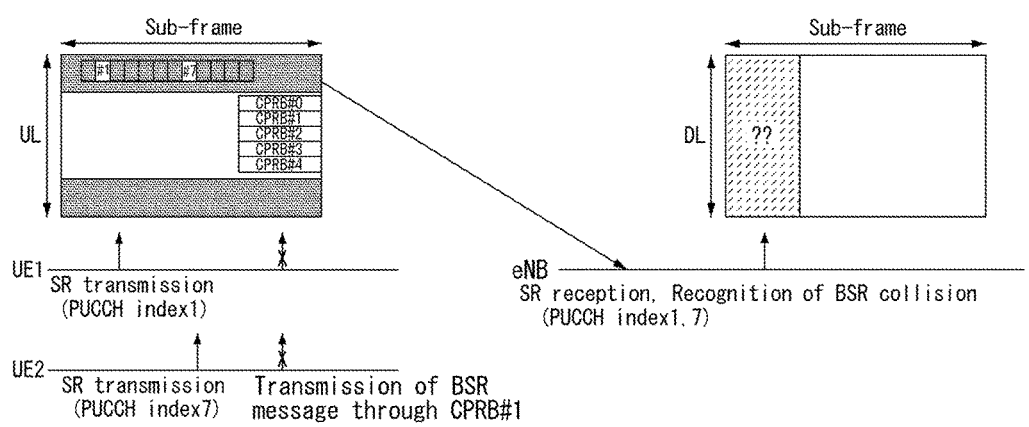

[Figure 32]
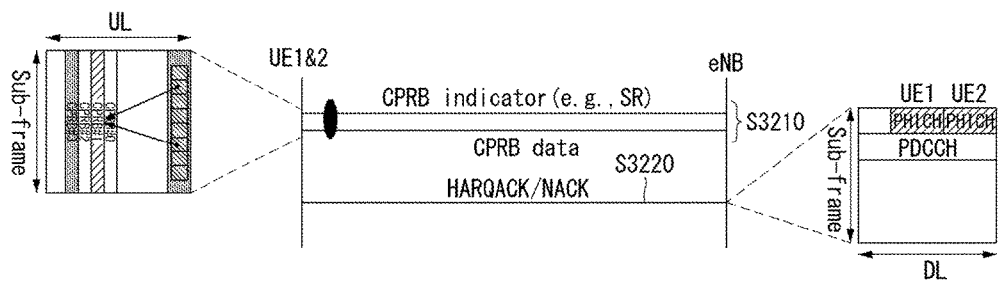

[Figure 33]

| CPRB indicator value | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| CPRB index (N=4) | 0 | 1 | 2 | 3 | 0 | 1 | 2 | 3 | 0 | 1 | 2 | 3 | 0 | 1 | 2 | 3 |
| Cyclic Shift | 0 | 0 | 0 | 0 | 1 | 1 | 1 | 1 | 2 | 2 | 2 | 2 | 3 | 3 | 3 | 3 |

【Figure 34】

| CPRB indicator value | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Cyclic Shift | 0 | 1 | 2 | 3 | 4 | 5 | 6 | 7 | 0 | 1 | 2 | 3 | 4 | 5 | 6 | 7 |

【Figure 35】
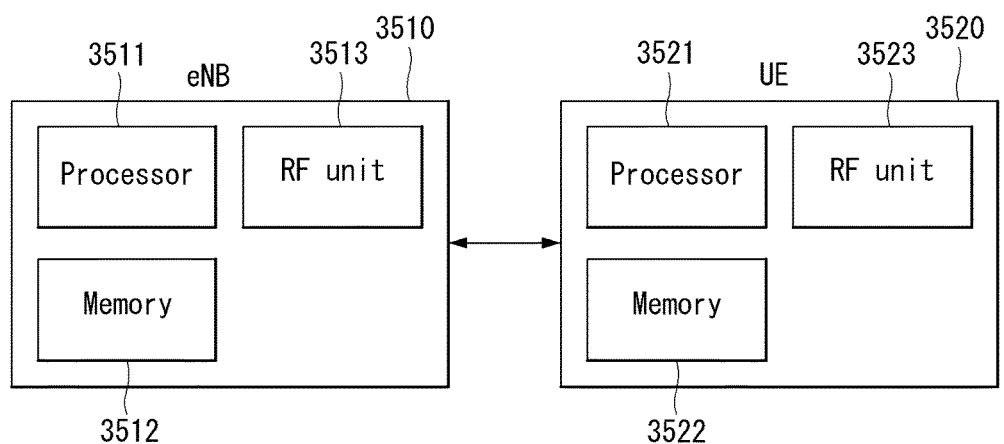

UPLINK DATA TRANSMISSION METHOD IN WIRELESS COMMUNICATION SYSTEM AND APPARATUS FOR THE SAME

CROSS-REFERENCE TO RELATED APPLICATIONS

This application is the National Stage filing under 35 U.S.C. 371 of International Application No. PCT/KR2015/000415, filed on Jan. 15, 2015, which claims the benefit of U.S. Provisional Application No. 62/026,050, filed on Jul. 18, 2014, the contents of which are all hereby incorporated by reference herein in their entirety.

TECHNICAL FIELD

The present invention relates to a wireless communication system and more particularly, a method for a terminal to transmit uplink data to a base station and an apparatus supporting the method.

BACKGROUND ART

Mobile communication systems have been developed to provide a voice service while ensuring mobility of users. The mobile communication system has evolved to provide a data service in addition to the voice service. These days, due to explosive growth of traffic, communication resources are easily running short. Also, since demand for higher speed services is great, needs for more advanced mobile communication systems are getting larger.

Requirements for the next-generation mobile communication system largely include accommodation of explosive data traffic, considerable increase of transmission rate for each user, accommodation of the significantly increased number of connected devices, very low end-to-end latency, and high energy efficiency. To meet the requirements, various technologies such as dual connectivity, massive multiple input multiple output (MIMO), in-band full duplex, non-orthogonal multiple access (NOMA), support for super-wideband communication, and device networking are being studied.

DISCLOSURE

Technical Problem

The present invention has been made in an effort to provide a method for preventing collision during transmission and reception of inability of terminals to estimate an UL data channel due to selection of the same CPRB and an error correction response (HARQ ACK/NACK) mapped to the inability by allocating a cyclic shift value with respect to a CPRB based on CPRB indication information.

Technical objects of the present invention are not limited to those objects described above; other technical objects not mentioned above can be clearly understood from what are described below by those skilled in the art to which the present invention belongs.

Technical Solution

To achieve the technical object, in a method for transmitting uplink (UL) data requiring low latency in a wireless communication system according to the present invention, the method carried out by a mobile terminal comprises transmitting contention PUSCH resource block (CPRB) indication information used for identifying a particular terminal and/or particular data to a base station; transmitting UL data to the base station through CPRB resources of a contention based PUSCH (CP) zone; and receiving a hybrid automatic retransmit request (HARQ) response with respect to the UL data from the base station through a physical hybrid ARQ indicator channel (PHICH), where the CP zone is a resource area from which UL data can be transmitted without allocation of an UL grant and a cyclic shift (CS) set up based on the CPRB indication information is mapped to the CPRB resource and the PHICH.

The CPRB indication information is a signal or a sequence transmitted through a physical uplink shared channel (PUSCH) or a physical uplink control channel (PUCCH).

The value of a cyclic shift ranges from 0 to <(the maximum value of the CPRB indication information value+1)/N>−1 for the same CPRB.

The PHICH is assigned for each terminal according to the cyclic shift value.

The CPRB indication information and the UL data are transmitted from the same subframe or through consecutive subframes.

In a method for receiving UL data requiring low latency in a wireless communication system, the method carried out by a base station comprises receiving contention PUSCH resource block (CPRB) indication information used for identifying a particular terminal and/or particular data from at least two or more terminals; receiving uplink (UL) data through CPRB resource of a contention based PUSCH (CP) zone from the at least two or more terminals; and transmitting a hybrid automatic retransmit request (HARQ) response with respect to the UL data through a physical hybrid ARQ indicator channel (PHICH) to the at least two or more terminals, where the CP zone is a resource area from which UL data can be transmitted without allocation of an UL grant and a cyclic shift (CS) set up based on the CPRB indication information is mapped to the CPRB resource and the PHICH.

A mobile terminal for transmitting uplink (UL) data in a wireless communication system comprises a radio frequency (RF) unit for transmitting and receiving a radio signal; and a processor, where the processor is controlled to transmit contention PUSCH resource block (CPRB) indication information used for identifying a particular terminal and/or particular data to a base station; to transmit uplink data to the base station through CPRB resources of a contention based PUSCH (CP) zone; and to receive a hybrid automatic retransmit request (HARQ) response with respect to the UL data from the base station through a physical hybrid ARQ indicator channel (PHICH); and where the CP zone is a resource area from which UL data can be transmitted without allocation of an UL grant and a cyclic shift (CS) set up based on the CPRB indication information is mapped to the CPRB resource and the PHICH.

Advantageous Effects

The present invention allocates a cyclic shift value with respect to a CPRB on the basis of CPRB indication information, thereby resolving a collision problem of UL data resources (e.g., demodulation-reference signal (DMRS)) that can be caused by terminals' selection of the same CPRB and increasing a probability of successfully transmitting and receiving UL data.

The present invention allocates a cyclic shift value based on CPRB indication information, thereby resolving a collision problem during transmission and reception of an error correction response (HARQ ACK/NACK) with respect to UL data transmitted through the same CPRB.

The advantageous effects that can be obtained from application of the present invention are not limited to the aforementioned effects, but other advantageous effects not mentioned above will be clearly understood from the descriptions below by those skilled in the art to which the present invention belongs.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates one example of a network structure of evolved universal terrestrial radio access network (E-UTRAN) to which the present invention can be applied;

FIG. 2 illustrates a radio interface protocol structure defined between a mobile terminal and an E-UTRAN in a wireless communication system to which the present invention can be applied;

FIG. 3 illustrates physical channels used for the 3GPP LTE/LTE-A system to which the present invention can be applied and a general signal transmission method using the physical channels;

FIG. 4 illustrates a radio frame structure defined in the 3GPP LTE/LTE-A system to which the present invention can be applied;

FIG. 5 illustrates a resource grid with respect to one downlink slot in a wireless communication system to which the present invention can be applied;

FIG. 6 illustrates a structure of a downlink subframe in a wireless communication system to which the present invention can be applied;

FIG. 7 illustrates a structure of an uplink subframe in a wireless communication system to which the present invention can be applied;

FIG. 8 illustrates a structure of DCI format 0 in a wireless communication system to which the present invention can be applied;

FIG. 9 illustrates one example where PUCCH formats are mapped to the PUCCH region of an uplink physical resource block in a wireless communication system to which the present invention can be applied;

FIG. 10 illustrates a structure of a CQI channel for the case of a normal CP in a wireless communication system to which the present invention can be applied;

FIG. 11 illustrates a structure of an ACK/NACK channel for the case of a normal CP in a wireless communication system to which the present invention can be applied;

FIG. 12 illustrates a method for multiplexing ACK/NACK and SR in a wireless communication system to which the present invention can be applied;

FIG. 13 illustrates an MAC PDU used by an MAC entity in a wireless communication system to which the present invention can be applied;

FIGS. 14 and 15 illustrate a sub-header of an MAC PDU in a wireless communication system to which the present invention can be applied;

FIG. 16 illustrates a format of an MAC control element for reporting a buffer state in a wireless communication system to which the present invention can be applied;

FIG. 17 illustrates one example of a component carrier and carrier aggregation in a wireless communication system to which the present invention can be applied;

FIG. 18 illustrates an uplink resource allocation process of a mobile terminal in a wireless communication system to which the present invention can be applied;

FIG. 19 illustrates latency in a C-plane required in the 3GPP LTE-A system to which the present invention can be applied;

FIG. 20 illustrates transition time of a synchronized terminal from a dormant state to an active state required in the 3GPP LTE-A system to which the present invention can be applied;

FIG. 21 illustrate one example of a random access procedure;

FIG. 22 illustrates another example of a structure of an uplink subframe;

FIG. 23 illustrates a signal processing procedure for transmitting an uplink reference signal;

FIG. 24 illustrates a structure of a subframe for transmitting demodulation reference signal;

FIG. 25 illustrates one example of setting a CP zone and a contention PUSCH resource block;

FIG. 26 illustrates another example of a contention PUSCH resource block;

FIG. 27 illustrates one example of a method for transmitting information related to a CP zone;

FIG. 28 illustrates one example of a method for using a CP zone in a buffer state report (BSR) procedure;

FIG. 29 illustrates various ways of setting a CP zone when a buffer state report (BSR) procedure uses the CP zone;

FIG. 30 illustrates one example of a method for CPRB mapping in a buffer state report (BSR) procedure;

FIG. 31 illustrates one example of collision occurred at the time of BSR transmission due to occupation of the same CPRB;

FIG. 32 illustrates one example of a method for setting a DMRS cyclic shift of a CPRB according to the present invention;

FIG. 33 illustrates one example of a method for setting a DMRS cyclic shift value according to the present invention;

FIG. 34 illustrates another example of a method for setting a DMRS cyclic shift value according to the present invention; and FIG. 35 illustrates a block diagram of a wireless communication device to which the present invention can be applied.

MODE FOR INVENTION

In what follows, preferred embodiments according to the present invention will be described in detail with reference to appended drawings. The detailed descriptions given below with reference to appended drawings are intended only to provide illustrative embodiments of the present invention and do not represent the only embodiments thereof. The detailed descriptions of the present invention below include specific details for the purpose of comprehensive understanding of the present invention. However, those skilled in the art may readily understand that the present invention can be implemented without those specific details.

For some case, in order to avoid inadvertently making the technical concept of the present invention obscured, the structure and the apparatus well-known to the public can be omitted or illustrated in the form of a block diagram with respect to essential functions of the structure and the apparatus.

A base station in this document is defined as a terminal node of a network which carries out communication directly with a terminal. Particular operations in this document described to be carried out by a base station may be carried out by an upper node of the base station depending on the situation. In other words, it is evident that in a network consisting of a plurality of network nodes including a base station, various operations carried out for communication with terminals can be carried out the base station or other network nodes other than the base station. The term of base station (BS) can be substituted for by those terms such as fixed station, Node B, evolved-NodeB (eNB), base transceiver system (BTS), and access point (AP). Also, a terminal may be stationary or mobile and can be referred to by different terms such as a User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, and Device-to-Device (D2D) device.

In what follows, downlink transmission denotes communication from the BS to the UE, and uplink transmission denotes communication from the UE to the BS. In the downlink transmission, a transmitter can be a part of the BS while a receiver can be a part of the UE. In the uplink transmission, a transmitter can be a part of the UE while a receiver can be a part of the base station.

Particular terms used in the descriptions below are introduced to help understand the present invention and can be modified in various other ways as long as a modified use thereof does not depart from the technical principles and concept of the present invention.

Technologies described below can be used by various wireless access systems based on the scheme such as CDMA (code division multiple access), FDMA (frequency division multiple access), TDMA (time division multiple access), OFDMA (orthogonal frequency division multiple access), SC-FDMA (single carrier frequency division multiple access), and NOMA (non-orthogonal multiple access). The CDMA scheme can be implemented by a radio technology such as universal terrestrial radio access (UTRA) and CDMA2000. The TDMA scheme can be implemented by a radio technology such as global system for mobile communications (GSM), general packet radio service (GPRS), and enhanced data rates for GSM evolution (EDGE). The OFDMA scheme can be implemented by such as radio technology as defined by the IEEE 802.11 (Wi-Fi), IEEE 802.16 (WiMAX), IEEE 802.20, and evolved UTRA (E-UTRA). The UTRA is a part of standards specifying the universal mobile telecommunications system (UMTS). The $3^{rd}$ generation partnership project (3GPP) long term evolution (LTE) is a part of standards of the evolved UMTS (E-UMTS) employing the E-UTRA, employing the OFDMA scheme for downlink transmission and the SC-FDMA scheme for uplink transmission. The LTE-A (Advanced) is an enhancement of the 3GPP LTE standard.

The embodiments of this document can be supported by at least one of the standard specifications for wireless access systems such as the IEEE 802, 3GPP, and 3GPP2. In other words, the standard specifications can be used to support those steps or parts among the embodiments of the present invention not explicitly described in favor of clarifying the technical principles thereof. Also, for technical definitions of the terms used in this document, the standard documents should be consulted.

For the purpose of clarity, this document is described based on the 3GPP LTE/LTE-A standard; however, it should be understood that the present invention is not limited to the specific standard.

The Overall System

FIG. 1 illustrates one example of a network structure of the evolved universal terrestrial radio access network (E-UTRAN) to which the present invention can be applied.

The E-UTRAN system is an enhancement of the UTRAN system, and can be referred to as the 3GPP LTE/LTE-A system. The E-UTRAN system includes eNBs which provide a control plane and a user plane to a UE, and the eNBs are connected to each other through X2 interface. The X2 user plane interface (X2-U) is defined among the eNBs. The X2-U interface is intended to provide non-guaranteed delivery of a user plane's packet data unit (PDU). The X2 control plane interface (X2-CP) is defined between two neighboring eNBs. The X2-CP performs the function of context delivery between eNBs, control of a user plane tunnel between a source eNB and a target eNB, delivery of handover-related messages, and uplink load management. An eNB is connected to a UE through an air interface and connected to an evolved packet core (EPC) through the S1 interface. The S1 user plane interface (S1-U) is defined between an eNB and a serving gateway (S-GW). The S1 control plane interface (S1-MME) is defined between an eNB and a mobility management entity (MME). The S1 interface performs an evolved packet system (EPS) bearer service management function, a non-access stratum (NAS) signaling transport function, network sharing, an MME load balancing function, and so on. The S1 interface supports many-to-many relation between an eNB and an MME/S-GW.

FIG. 2 illustrates a radio interface protocol structure defined between a UE and an E-UTRAN in a wireless communication system to which the present invention can be applied. FIG. 2(a) illustrates a radio protocol structure of a control plane, and FIG. 2(b) illustrates a radio protocol structure of a user plane.

With reference to FIG. 2, layers of a radio interface protocol between the UE and the E-UTRAN can be classified into a first layer (L1), a second layer (L2), and a third layer (L3) based on the lower three layers of the open system interconnection (OSI) model that is well-known in the communication system technology field. The radio interface protocol between the UE and the E-UTRAN is divided horizontally into a physical layer, a data link layer, and a network layer; and divided vertically into a user plane which is a protocol stack for data information transmission and a control plane which is a protocol stack for transmission of a control signal.

The control plane refers to a path along which control messages for the UE and the network to manage calls are transmitted. The user plane refers to a path along which data created in the application layer, for example, voice data or Internet packet data are transmitted. In what follows, the control plane and the user plane of the radio protocol will be described. The physical (PHY) layer belonging to the first layer provides an information transfer service to an upper layer by using a physical channel. The PHY layer is connected to the medium access control (MAC) layer belonging to the upper layer through a transport channel, and data are transferred between the MAC layer and the PHY layer through the transport channel. The transport channel is classified according to how and with what characteristics data are transferred through a radio interface. And a physical channel is employed to transfer data between disparate physical layers and between a physical layer of a transmitter end and a physical layer of a receiver end. The physical layer is modulated by OFDM scheme and uses time and frequency as radio resources.

There are a few physical control channels used in the physical layer. A physical downlink control channel (PDCCH) informs the UE of a paging channel (PCH), resource allocation of a downlink shard channel (DL-SCH), and hybrid automatic repeat request (HARQ) information related to an uplink shared channel (UL-SCH). Also, the PDCCH can carry an uplink grant which informs the UE of resource allocation for uplink transmission. A physical control format indicator channel (PDFICH) informs the UE of the number of OFDM symbols used for the PDCCHs and is transmitted for each subframe. A physical HARQ indicator channel (PHICH) carries a HARQ acknowledge (ACK)/non-acknowledge (NACK) signal in response to the uplink transmission. A physical uplink control channel (PUCCH) carries requests scheduling of the HARQ ACK/NACK signal for downlink transmission and carries uplink control information such as a channel quality indicator (CQI). A physical uplink shared channel (PUSCH) carries an UL-SCH.

The MAC layer of the second layer (L2) provides a service to its upper layer, radio link control (RLC) layer, through a logical channel Functions of the MAC layer includes mapping between a logical channel and a transport channel; and multiplexing/demultiplexing of transport blocks provided to a physical channel on a transport channel of a MAC service data unit (SDU) belonging to the logical channel.

The RLC layer of the second layer (L2) supports reliable transmission of data. Functions of the RLC layer include concatenation, segmentation, and reassembly of the RLC SDU. To ensure various levels of quality of service (QoS) that a radio bearer (RB) requests, the RLC layer provides three operating modes: transparent mode (TM), unacknowledged mode (UM), and acknowledge mode (AM). The AM RLC provides error correction through an automatic repeat request (ARQ). Meanwhile, in case the MAC layer carries the RLC function, the RLC layer can be included as a functional block of the MAC layer.

A packet data convergence protocol (PDCP) layer of the second layer (L2) carries functions of transfer of user data in the user plane, header compression, and ciphering. The header compression refers to the function of reducing the size of the IP packet header which carries relatively large and unnecessary control information so that Internet protocol (IP) packets such as the Internet protocol version 4 (IPv4) or the Internet protocol version 6 (IPv6) can be transmitted efficiently through a radio interface with narrow bandwidth. Functions of the PDCP layer in the control plane include transfer of plane data and ciphering/integrity protection.

The radio resource control (RRC) layer located in the lowest part of the third layer (L3) is defined only in the control plane. The RRC layer controls radio resources between the UE and a network. To this end, the UE and the network exchanges RRC messages through the RRC layer. The RRC layer controls a logical channel, a transport channel, and a physical channel related to configuration, re-configuration, and release of radio bearers. A radio bearer refers to a logical path that the second layer (L2) provides for data transmission between the UE and the network. Configuring a radio bearer indicates that a radio protocol layer and channel characteristics are defined for providing a particular service and specific parameters and an operating method thereof are set up. A radio bearer is again divided into a signaling RB (SRB) and a data RB (DRB). The SRB is used as a path for transmitting RRC messages in the control plan, and the DRB is used as a path for transmitting user data in the user plane.

The non-access stratum (NAS) layer located in the upper hierarchy of the RRC layer performs the function of session management, mobility management, and so on.

A cell constituting an eNB has bandwidth chosen from among 1.25, 2.5, 5, 10, 2 MHz and provides a downlink or an uplink transmission service to UEs. Bandwidth configuration can be carried out so that different cells have bandwidth different from each other.

Downlink transport channels for transporting data from a network to a UE include a broadcast channel (BCH) which transmits system information, a PCH which transmits a paging message, a DL-SCH which transmits user traffic or a control message. Downlink multicast or broadcast service traffic or a control message may be transmitted through the DL-SCH or through a separate multicast channel (MCH). Meanwhile, uplink transport channels for transporting data from the UE to the network include a random access channel (RACH) which transmits the initial control message and an uplink shared channel which transmits user traffic or a control message.

A logical channel lies in the upper hierarchy of a transport channel and is mapped to the transport channel. A logical channel is divided into a control channel for transmission of control area information and a traffic channel for transmission of user area information. Logical channels include a broadcast control channel (BCCH), a paging control channel (PCCH), a common control channel (CCCH), a dedicated control channel (DCCH), a multicast control channel (MCCH), a dedicated traffic channel (DTCH), and a multicast traffic channel (MTCH).

To manage a UE and mobility of the UE in the NAS layer located in the control plane, an EPS mobility management (EMM) registered state and an EMM-deregistered state can be defined. The EMM registered state and the EMM deregistered state can be applied to the UE and the MME. As in the case when the UE is powered on for the first time, the UE at its initial stage is in the EMM-deregistered state and carries out a process of registering for a network through an initial attach procedure to connect to the corresponding network. If the connection procedure is carried out successfully, the UE and the MME then make a transition to the EMM-registered state.

Also, to manage signaling connection between the UE and the network, an EPS connection management (ECM) connected state and an ECM-IDLE state can be defined. The ECM-CONNECTED state and the ECM-IDLE state can also be applied to the UE and the MME. The ECM connection includes an RRC connection established between the UE and an eNB and an S1 signaling connection established between the eNB and the MME. The RRC state indicates whether the RRC layer of the UE and the RRC layer of the eNB are connected logically to each other. In other words, if the RRC layer of the UE is connected to the RRC layer of the eNB, the UE stays in an RRC_CONNECTED state. If the RRC layer of the UE and the RRC layer of the eNB are not connected to each other, the UE stays in an RRC_IDLE state.

A network is capable of perceiving existence of a UE in the ECM-CONNECTED state at the cell level and controlling the UE in an effective manner. On the other hand, the network is unable to perceive the existence of a UE in the ECM-IDLE state, and a core network (CN) manages the UE on the basis of a tracking area which is a regional unit larger than the cell. If the UE is in the ECM-IDLE state, the UE carries out discontinuous reception (DRX) that the NAS configures by using the ID assigned uniquely in the tracking area. In other words, the UE can receive broadcast data of system information and paging information by monitoring a paging signal in a particular paging opportunity at each UE-particular paging DRX cycle. When the UE is in the ECM-IDLE state, the network does not hold context information of the UE. Therefore, the UE in the ECM-IDLE state can carry out a mobility-related procedure based on the UE such as cell selection or cell reselection without having to take an order of the network. In case the position of the UE in the ECM-IDLE state changes from the position known to the network, the UE can inform the network about its position through a tracking area update (TAU) procedure. On the other hand, if the UE is in the ECM-CONNECTED state, mobility of the UE is managed by the command of the network. While the UE is in the ECM-CONNECTED state, the network is informed of the cell to which the UE belongs to. Therefore, the network transmits and receives data to and from the UE, controls mobility such as the UE's handover, and carries out cell measurement of neighboring cells.

As described above, in order for the UE to receive a conventional mobile communication service such as voice or data communication, the UE needs to make a transition to the ECM-CONNECTED state. When the UE is powered on for the first time, the UE at its initial stage stays in the ECM-IDLE state similarly as done for the EMM state; if the UE is registered successfully to the corresponding network through the initial attach procedure, the UE and the MME make a transition to the ECM-CONNECTED state. Also, if the UE is registered in the network but radio resources are not assigned as traffic is deactivated, the UE stays in the ECM-IDLE state; if new uplink or downlink traffic is generated for the corresponding UE, the UE and the MME make a transition to the ECM-CONNECTED state through a service request procedure.

FIG. 3 illustrates physical channels used for the 3GPP LTE/LTE-A system to which the present invention can be applied and a general signal transmission method using the physical channels.

A UE, which may have been powered on again from the power-off state or may have newly entered a cell, carries out the initial cell search task such as synchronizing itself with an eNB in the S301 step. To this purpose, the UE synchronizes with the eNB by receiving a primary synchronization channel (P-SCH) and a secondary synchronization channel (S-SCH) from the eNB and obtains information such as a cell ID (identifier).

Afterwards, the UE receives a physical broadcast channel (PBCH) signal from the eNB and obtains broadcast signal within the eNB. Meanwhile, the UE receives a downlink reference signal (DL RS) in the initial cell search step to check the downlink channel status.

The UE which has finished the initial cell search receives a PDSCH according to the PDCCH and PDCCH information in the S302 step to obtain more specific system information.

Next, the UE may carry out a random access procedure such as the steps of S303 to S306 to complete a connection process to the eNB. To this purpose, the UE transmits a preamble S303 through a physical random access channel (PRACH) and receives a response message in response to the preamble through a PDSCH corresponding to the PRACH S304. In the case of contention-based random access, the UE may carry out a contention resolution procedure including transmission of an additional PRACH signal S305 and reception of a PDCCH signal and the PDSCH signal corresponding to the PDCCH signal S306.

Afterwards, the UE which has carried out the procedure above may carry out reception S307 of the PDCCH signal and/or PDSCH signal and transmission S308 of a PUSCH signal and/or a PUCCH signal as a conventional uplink/downlink signal transmission procedure.

The control information that the UE transmits to the eNB is called collectively uplink control information (UCI). The UCI includes HARQ-ACK/NACK, a scheduling request (SR), a channel quality indicator (CQI), a precoding matrix indicator (PMI), and rank indication (RI) information.

In the LTE/LTE-A system, the UCI is transmitted periodically through the PUCCH; the UCI can be transmitted through the PUSCH if control information and traffic data have to be transmitted at the same time. Also, the UCI can be transmitted non-periodically through the PUSCH according to a request or a command from the network.

FIG. 4 illustrates a radio frame structure defined in the 3GPP LTE/LTE-A system to which the present invention can be applied.

In the cellular OFDM wireless packet communication system, transmission of uplink/downlink data packets is carried out in units of subframes, and one subframe is defined as a predetermined time period including a plurality of OFDM symbols. The 3GPP LTE/LTE-A standard supports a type 1 radio frame structure that can be applied to frequency division duplex (FDD) scheme and a type 2 radio frame structure that can be applied to time division duplex (TDD) scheme. In the FDD mode, uplink transmission and downlink transmission are carried out separately in the respective frequency bands. On the other hand, for the TDD mode, uplink and downlink transmission are carried out separately in the time domain but occupy the same frequency band. Channel responses in the TDD mode are in fact reciprocal. This implies that a downlink channel response is virtually the same as the corresponding uplink channel response in the frequency domain. Therefore, it can be regarded as an advantage for a wireless communication system operating in the TDD mode that a downlink channel response can be obtained from an uplink channel response. Since the whole frequency domain is so utilized in the TDD mode that uplink and downlink transmission are performed in time division fashion, downlink transmission by an eNB and uplink transmission by a UE cannot be performed simultaneously. In a TDD system where uplink and downlink transmission are managed in units of subframes, uplink and downlink transmission are carried out separately in the respective subframes.

FIG. 4(a) illustrates a structure of a type 1 radio frame. A downlink radio frame consists of 10 subframes, and each subframe consists of two slots in the time domain. The time period needed to transmit one subframe is called a Transmission Time Interval (TTI). For example, length of each subframe can amount to 1 ms, and length of each slot can be 0.5 ms. Each slot includes a plurality of orthogonal frequency division multiplexing (OFDM) symbols in the time domain, and includes a plurality of resource blocks (RBs) in the frequency domain. The 3GPP LTE/LTE-A system uses the OFDMA method for downlink transmission; therefore, the OFDM symbol is intended to represent one symbol period. One OFDM symbol may be regarded to correspond to one SC-FDMA symbol or a symbol period. The resource block as a unit for allocating resources includes a plurality of consecutive subcarriers within one slot.

The number of OFDM symbols included within one slot can be varied according to the configuration of a cyclic prefix. The CP has an extended CP and a normal CP. For example, in case the OFDM symbol consists of normal CPs, the number of OFDM symbols included within one slot can be 7. In case the OFDM symbol consists of extended CPs, the number of OFDM symbols included within one slot becomes smaller than that for the normal CP case since the length of a single OFDM is increased. In the case of extended CP, for example, the number of OFDM symbols included within one slot can be 6. In case a channel condition is unstable as observed when the UE moves with a high speed, the extended CP can be used to further reduce inter-symbol interference.

Since each slot consists of 7 OFDM symbols when a normal CP is used, one subframe includes 14 OFDM symbols. At this time, the first maximum 3 OFDM symbols of each subframe are allocated to the physical downlink control channel (PDCCH) and the remaining OFDM symbols are allocated to the physical downlink shared channel (PDSCH).

FIG. 4(b) illustrates a type 2 radio frame. The type 2 radio frame consists of two half frames, and each half frame consists of 5 subframes, and each subframe consists of two slots. Among the 5 subframes, a special subframe consists of a downlink pilot time slot (DwPTS), a guard period (GP), and an uplink pilot time slot (UpPTS). The DwPTS is used for the UE to carry out the initial cell search, synchronization, and channel estimation. The UpPTS is used for the eNB to carry out channel estimation and uplink transmission synchronization with the UE. The GP is a period intended for removing interference generated during uplink transmission due to multi-path delay of a downlink signal between uplink and downlink transmission.

The structure of a radio frame described above is just an example, and the number of subframes included within one radio frame, the number of slots included within one subframe, and the number of symbols included within one slot can be varied in many ways.

FIG. 5 illustrates a resource grid with respect to one downlink slot in a wireless communication system to which the present invention can be applied.

With reference to FIG. 5, one downlink slot includes a plurality of OFDM symbols in the time domain. Each downlink slot includes 7 OFDM symbols, and each resource block includes 12 subcarriers in the frequency domain. However, the present invention is not limited to the illustrative configuration.

Each element of resource grids is called a resource element, and a resource block includes 12×7 resource elements. Each resource element in the resource grids can be identified by an index pair (k, l) within a slot. Here, k (k=0, . . . , $N_{RB}$×12−1) stands for a subcarrier index in the frequency domain while l (l=0, . . . , 6) an OFDM symbol index in the time domain. The number $N_{RB}$ of resource blocks included in a downlink slot is dependent on downlink transmission bandwidth. The structure of an uplink slot can be the same as that of the downlink slot.

FIG. 6 illustrates a structure of a downlink subframe in a wireless communication system to which the present invention can be applied.

With reference to FIG. 6, in the first slot within a subframe, the first maximum three OFDM symbols make up a control region to which control channels are allocated, and the remaining OFDM symbols form a data region to which a PDSCH is allocated. The 3GPP LTE/LTE-A standard defines PCFICH, PDCCH, and PHICH as downlink control channels.

The PCFICH is transmitted from the first OFDM symbol of a subframe and carries information about the number (namely, size of the control region) of OFDM symbols used for transmission of control channels within a subframe. The PHICH is a response channel with respect to an uplink and carries a ACK/NACK signal with respect to HARQ. The control information transmitted through the PDCCH is called downlink control information (DCI). The DCI includes uplink resource allocation information, downlink resource allocation information, or uplink transmission (Tx) power control commands for an arbitrary UE group.

An eNB determines the PDCCH format according to Downlink Control Information (DCI) to be sent to a UE and adds a Cyclic Redundancy Check (CRC) to the control information. The CRC is masked with a unique identifier depending on an owner of the PDCCH or intended use of the PDCCH, which is called a Radio Network Temporary Identifier (RNTI). In the case of a PDCCH intended for a particular UE, a unique identifier for the UE, for example, Cell-RNTI (C-RNTI) can be masked with the CRC. Similarly, the CRC can be masked with a paging identifier, for example, Paging-RNTI (P-RNTI) in the case of a PDCCH intended for a paging message. The CRC can be masked with a system information identifier, for example, System Information-RNTI (SI-RNTI) in the case of a PDCCH intended for system information block. The CRC can be masked with a Random Access-RNTI (RA-RNTI) to designate a random access response in response to transmission of a random access preamble of the UE.

FIG. 7 illustrates a structure of an uplink subframe in a wireless communication system to which the present invention can be applied.

With reference to FIG. 7, an uplink subframe is divided into a control region and a data region in the frequency domain. A PUCCH which carries uplink control information is allocated to the control region. A PUSCH which carries data is allocated to the data region. If an upper layer commands, the UE can support the PUSCH and the PUCCH at the same time. A resource block pair is allocated within a subframe for the PUCCH of each UE. The resource blocks belonging to a resource block pair allocated to the PUCCH occupy different subcarriers at each of two slots based on a slot boundary. In this case, the resource block pair allocated to the PUCCH is said to perform frequency hopping at slot boundaries.

Physical Downlink Control Channel (PDCCH)

The control information transmitted through a PDCCH is called downlink control indicator (DCI). The size and use of the control information transmitted through the PDCCH vary according to the DCI format, and the size can still be changed according to a coding rate.

Table 1 shows the DCI according to the DCI format.

TABLE 1

| DCI format | Objectives |
|---|---|
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |

TABLE 1-continued

| DCI format | Objectives |
|---|---|
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |
| 4 | the scheduling of PUSCH in one UL cell with multi-antenna port transmission mode |

With reference to Table 1, each value of the DCI format indicates the following objective: format 0 for scheduling of PUSCH, format 1 for scheduling of one PDSCH codeword, format 1A for compact scheduling of one PDSCH codeword, format 1C for very compact scheduling of DL-SCH, format 2 for PDSCH scheduling in a closed-loop spatial multiplexing mode, format 2A for PDSCH scheduling in an open loop spatial multiplexing mode, format 3 and 3A for transmission of transmission power control (TPC) command for an uplink channel, and format 4 for PUSCH scheduling within one uplink cell in a multi-antenna port transmission mode.

The DCI format 1A can be used for PDSCH scheduling no matter what transmission mode is applied.

The DCI format can be applied separately for each UE, and PDCCHs for multiple UEs can be multiplexed within one subframe. A PDCCH is formed by aggregation of one or a few consecutive control channel elements (CCEs). A CCE is a logical allocation unit used for providing a PDCCH with a coding rate according to the state of a radio channel. One REG comprises four REs, and one CCE comprises nine REGs. To form one PDCCH, {1, 2, 4, 8} CCEs can be used, and each element of the set {1, 2, 4, 8} is called a CCE aggregation level. The number of CCEs used for transmission of a particular PDCCCH is determined by the eNB according to the channel condition. The PDCCH established according to each UE is mapped being interleaved to the control channel region of each subframe according to a CCE-to-RE mapping rule. The position of the PDCCH can be varied according to the number of OFDM symbols for a control channel of each subframe, the number of PHICH groups, transmission antenna, and frequency transition.

As described above, channel coding is applied independently to the PDCCH of each of the multiplexed UEs, and cyclic redundancy check (CRC) is applied. The CRC is masked with a unique identifier (ID) of each UE so that the UE can receive its PDCCH. However, the eNB does not inform the UE about the position of the corresponding PDCCH in the control region allocated within a subframe. Since the UE is unable to get information about from which position and at which CCE aggregation level or in which DCI format the UE's PDCCH is transmitted to receive a control channel transmitted from the eNB, the UE searches for its PDCCH by monitoring a set of PDCCH candidates within the subframe. The above operation is called blind decoding (BD). Blind decoding can be also called blind detection or blind search. The blind decoding refers to the method with which the UE demasks the UE ID in the CRC section and checks any CRC error to determine whether the corresponding PDCCH is the UE's control channel.

In what follows, described will be the information transmitted through the DCI format 0.

FIG. 8 illustrates a structure of DCI format 0 in a wireless communication system to which the present invention can be applied.

The DCI format 0 is used for scheduling a PUSCH in an uplink cell.

Table 2 shows the information transmitted through the DCI format 0.

TABLE 2

| Format 0 (Release 8) | Format 0 (Release 10) |
|---|---|
|  | Carrier Indicator (CIF) |
| Flag for format 0/format 1A differentiation | Flag for format 0/format 1A differentiation |
| Hopping flag (FH) | Hopping flag (FH) |
| Resource block assignment (RIV) | Resource block assignment (RIV) |
| MCS and RV | MCS and RV |
| NDI (New Data Indicator) | NDI (New Data Indicator) |
| TPC for PUSCH | TPC for PUSCH |
| Cyclic shift for DM RS | Cyclic shift for DM RS |
| UL index (TDD only) | UL index (TDD only) |
| Downlink Assignment Index (DAI) | Downlink Assignment Index (DAI) |
| CSI request (1 bit) | CSI request (1 or 2 bits: 2 bit is for multi carrier) |
|  | SRS request |
|  | Resource allocation type (RAT) |

With reference to FIG. 8 and Table 2, the information transmitted through the DCI format 0 is as follows.

1) Carrier indicator—consists of 0 or 3 bits.

2) Flag for identifying the DCI format 0 and format 1A—consists of 1 bit, where 0 indicates the DCI format 0 and 1 indicates the DCI format 1A.

3) Frequency hopping flag—consists of 1 bit. This field can be used to allocate the most significant bit (MSB) of the corresponding resource allocation for multi-cluster allocation depending on the needs.

Resource block assignment and hopping resource allocation—consists of $\lceil \log_2 (N_{RB}^{DL}(N_{RB}^{DL}+1)/2) \rceil$ bits.

In the case of PUSCH hopping for single-cluster allocation, NUL_hop MSBs are used to obtain the value of $ñ_{PRB}(i)$. The $(\lceil \log_2 (N_{RB}^{UL}(N_{RB}^{UL}+1)/2) \rceil - N_{UL\_hop})$ bit provides resource allocation of the first slot within an uplink subframe. Also, in case there is no PUSCH hopping for single-cluster allocation, the $(\lceil \log_2 (N_{RB}^{UL}(N_{RB}^{UL}+1)/2) \rceil)$ bit provides resource allocation within the uplink subframe. Also, in case there is no PUSCH hopping for multi-cluster allocation, resource allocation information is obtained from concatenation of a frequency hopping flag, resource block allocation, and hopping resource allocation field; and the $$\left\lceil \log_2 \left( \binom{\lceil N_{RB}^{UL}/P + 1 \rceil}{4} \right) \right\rceil$$

bit provides resource allocation within the uplink subframe. At this time, the P value is determined by the number of downlink resource blocks.

5) Modulation and coding scheme—consists of 5 bits.

6) New data indicator—consists of 1 bit.

7) Transmit power control command for PUSCH—consists of 2 bits.

8) Index of cyclic shift for demodulation reference signal (DMRS) and orthogonal cover/orthogonal cover code (OC/OCC)—consists of 3 bits.

9) Uplink index—consists of 2 bits. This field is defined only for the TDD operation according to uplink-downlink configuration 0.

10) Downlink assignment index (DAI)—consists of 2 bits. This field is defined only for the TDD operation according to uplink-downlink configuration 1 to 6.

11) Channel state information (CSI) request—consists of 1 bit or 2 bits. At this time, a two-bit field is applied only when the corresponding DCI is mapped to the UE, for which one or more downlink cells are configured, by Cell-RNTI (C-RNTI) in a UE-specific manner.

12) Sounding reference signal (SRS) request—consists of 0 or 1 bit. At this time, this field is defined only when a scheduling PUSCH is mapped by the C-RNTI in a UE-specific manner.

13) Resource allocation type—consists of 1 bit.

In case the number of information bits within the DCI format 0 is smaller than the payload size of the DCI format 1A (including a padding bit), 0 is added to the DCI format 0 so that the number of information bits is equal to the payload size of the DCI format 1A.

Physical Uplink Control Channel (PUCCH)

A PUCCH carries various types of uplink control information (UCI) as follows according to the format.

Scheduling request (SR): information used for requesting uplink UL-SCH resources. An on-off keying method is used for transmission of an SR.

HARQ ACK/NACK: a response signal with respect to downlink data packet on a PDSCH. HARQ ACK/NACK indicates whether a downlink data packet has been successfully received. In response to a single downlink codeword, ACK/NACK 1 bit is transmitted, and in response to two downlink codewords, ACK/NACK 2 bits are transmitted.

Channel state information (CSI): feedback information about a downlink channel CSI includes at least one of channel quality indicator (CQI), rank indicator (RI), precoding matrix indicator (PMI), and precoding type indicator (PTI). In what follows, for the convenience of description, CQI is used to represent the various terms above.

A PUCCH can be modulated by BPSK (Binary Phase Shift Keying) and QPSK (Quadrature Phase Shift Keying) methods. Control information of a plurality of UEs can be transmitted through the PUCCH; in case code division multiplexing (CDM) is carried out to identify individual signals of the UEs, a constant amplitude zero auto correlation (CAZAC) sequence of length 12 is usually employed. Since a CAZAC sequence tends to keep a constant amplitude in the time domain and the frequency domain, the CAZAC sequence is useful for the UE to increase coverage by reducing the UE's peak-to-average power ratio (PAPR) or cubic metric (CM). Also, the ACK/NACK information about downlink data transmitted through the PUCCH is covered by an orthogonal sequence or an orthogonal cover (OC).

Also, control information transmitted on the PUCCH can be identified by a cyclically shifted sequence which has a different cyclic shift value from the others. A cyclically shifted sequence can be created by cyclically shifting a base sequence by as many as a predetermined cyclic shift amount. The amount of cyclic shift is specified by a CS index. The number of cyclic shifts available can be varied according to a delay spread of the corresponding channel Various types of sequences can be used as a base sequence, and the aforementioned CAZAC sequence is one of the examples.

Also, the amount of control information that the UE can transmit from a subframe can be determined according to the number of SC-FDMA symbols available for transmission of the control information (which indicates SC-FDMA symbols excluding the SC-FDMA symbol used for transmission of a reference signal (RS) for coherent detection of the PUCCH, but in the case of a subframe for which a sounding reference signal (SRS) is set up, the last SC-FDMA symbol of the subframe is also excluded).

A PUCCH is defined by 7 different formats according to control information transmitted, a modulation method used, the amount of control information, and so on. Properties of the uplink control information (UCI) transmitted according to each PUCCH format can be summarized as shown in Table 3.

TABLE 3

| PUCCH Format | Uplink Control Information(UCI) |
| --- | --- |
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 | HARQ ACK/NACK, SR, CSI (48 coded bits) |

With reference to Table 3, the PUCCH format 1 is used for exclusive transmission of a scheduling request (SR). In the case of exclusive transmission of an SR, an unmodulated waveform is applied.

The PUCCH format 1a or 1b is used for transmission of HARQ ACK/NACK (Acknowledgement/Non-Acknowledgement). In case the HARQ ACK/NACK is transmitted exclusively in an arbitrary subframe, the PUCCH format 1a or 1b can be used. HARQ ACK/NACK and SR may be transmitted from the same subframe by using the PUCCH format 1a or 1b.

The PUCCH format 2 is used for transmission of CQI, and the PUCCH format 2a or 2b is used for transmission of CQI and HARQ ACK/NACK. In the case of an extended CP, the PUCCH format 2 may be used for transmission of CQI and HARQ ACK/NACK.

The PUCCH format 3 is used to carry 48 bit encoded UCI. The PUCCH format 3 can carry HARQ ACK/NACK with respect to a plurality of serving cells, SR (in the case it exists), and CSI report about each serving cell.

FIG. 9 illustrates one example where PUCCH formats are mapped to the PUCCH region of an uplink physical resource block in a wireless communication system to which the present invention can be applied.

A PUCCH with respect to one UE is allocated to a resource block pair (RB pair) in a subframe. Resource blocks belonging to a resource block pair occupy different subcarriers in each of the first and the second slot. The frequency band occupied by a resource block belonging to the resource block pair allocated to a PUCCH is changed with respect to a slot boundary. In this case, the resource block pair allocated to the PUCCH is said to perform frequency hopping at slot boundaries. The UE, by transmitting uplink control information through subcarriers different with time, frequency diversity gain can be obtained.

In FIG. 9, $N_{RB}^{UL}$ represents the number of resource blocks in uplink transmission, and 0, 1, ..., $N_{RB}^{UL}-1$ denotes the number assigned to a physical resource block. By default, the PUCCH is mapped to both ends of an uplink frequency block. As shown in FIG. 9, the PUCCH format 2/2a/2b is mapped to the PUCCH region designated as m=0, 1, which can be interpreted that the PUCCH format 2/2a/2b is mapped to resource blocks located at band edges. Also, the PUCCH format 2/2a/2b and the PUCCH format 1/1a/1b can be mapped being mixed together to the PUCCH region designated as m=2. Next, the PUCCH format 1/1a/1b can be mapped to the PUCCH region designated as m=3, 4, 5. The number $N_{RB}^{(2)}$ of PUCCH RBs made available by the PUCCH format 2/2a/2b can be notified to the UEs within a cell through broadcasting signaling.

Table 4 shows a modulation method according to a PUCCH format and the number of bits per subframe. In Table 4, the PUCCH format 2a and 2b correspond to the case of a normal cyclic shift.

TABLE 4

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

Table 5 shows the number of symbols of a PUCCH demodulation reference signal per slot according to the PUCCH format.

TABLE 5

| PUCCH format | Normal cyclic prefix | Extended cyclic prefix |
|---|---|---|
| 1, 1a, 1b | 3 | 2 |
| 2, 3 | 2 | 1 |
| 2a, 2b | 2 | N/A |

Table 6 shows SC-FDMA symbol position of a PUCCH demodulation reference signal according to the PUCCH format. In Table 6, $l$ represents a symbol index.

TABLE 6

| | Set of values for $l$ | |
|---|---|---|
| PUCCH format | Normal cyclic prefix | Extended cyclic prefix |
| 1, 1a, 1b | 2, 3, 4 | 2, 3 |
| 2, 3 | 1, 5 | 3 |
| 2a, 2b | 1, 5 | N/A |

In what follows, the PUCCH format 2/2a/2b will be described.

The PUCCH format 2/2a/2b is used as CQI feedback (or ACK/NACK transmission along with CQI feedback) with respect to downlink transmission. In order for the CQI and ACK/NACK signal to be transmitted together, the ACK/NACK signal may be transmitted being embedded in the CQI RS (in the case of a normal CP) or transmitted after the CQI and ACK/NACK signal are jointly coded (in the case of an extended CP).

FIG. 10 illustrates a structure of a CQI channel for the case of a normal CP in a wireless communication system to which the present invention can be applied.

Among SC-FDMA symbols 0 to 6 in one slot, SC-FDMA symbol 1 and 5 (the second and the sixth symbol) are used for transmission of a demodulation reference signal (DMRS), and the remaining SC-FDMA symbols are used to transmit CQI information. Meanwhile, in the case of an extended CP, one SC-FDMA symbol (SC-FDMA symbol 3) is used for DMRS transmission.

The PUCCH format 2/2a/2b supports modulation based on a CAZAC sequence, and a QPSK-modulated symbol is multiplied with a CAZAC sequence of length 12. The cyclic shift of the sequence is changed between a symbol and a slot. Orthogonal covering is used for a DMRS.

Among 7 SC-FDMA symbols included in one slot, two SC-FDMA spaced apart from each other by three SC-FDMA symbols carries the DMRS, and the remaining 5 SC-FDMA symbols carry CQI information. The scheme of using two reference signals in one slot is intended to support high-speed UEs. Also, each UE is identified on the basis of a cyclic shift sequence. The CQI information symbols are transmitted being modulated with the entire SC-FDMA symbols, and each SC-FDMA symbol comprises one sequence. In other words, each UE modulates the CQI and transmits the modulated CQI to each sequence.

The number of symbols that can be transmitted to one TTI is 10, and modulation of CQI information is predetermined to use QPSK modulation. The first 5 symbols are transmitted from the first slot, and the remaining 5 symbols are transmitted from the second slot. In case QPSK mapping is used with respect to the SC-FDMA symbol, CQI value of two bits can be dealt with; therefore, each slot can carry CQI value of 10 bits. Accordingly, a maximum of 20 bits can be used for each subframe to carry the CQI value. In order to spread the CQI information in the frequency domain, frequency domain spreading code is used.

For frequency domain spreading code, a CAZAC sequence of length 12 (for example, zc sequence) can be used. Each control channel can be identified by applying the CAZAC sequence with a different cyclic shift value. Inverse fast fourier transform (IFFT) is carried out for frequency domain spread CQI information.

Twelve different UEs can be orthogonally multiplexed on the same PUCCH RB by cyclic shift having 12 equivalent intervals. In the case of normal CP, the DMRS sequence on the SC-FDMA symbol 1 and 5 (in the case of extended CP, on the SC-FDMA symbol 3) is similar to the CQI signal sequence in the frequency domain, but the same modulation as done for the CQI information is not applied.

A UE can be configured semi-statically by upper layer signaling to report different CQI, PMI, and RI types periodically on the PUCCH resources designated by the PUCCH resource index ($n_{PUCCH}^{(1,\tilde{p})}$, $n_{PUCCH}^{(2,\tilde{p})}$, $n_{PUCCH}^{(3,\tilde{p})}$,). At this time, the PUCCH resource index ($n_{PUCCH}^{(2,\tilde{p})}$) corresponds to the information indicating the PUCCH region used for PUCCH format 2/2a/2b transmission and a cyclic shift (CS) value to be used.

Table 7 shows an orthogonal sequence (OC) $[\overline{w}^{(\tilde{p})}(0) \ldots \overline{w}^{(\tilde{p})}(N_{RS}^{PUCCH}-1)]$ for an RS defined by the PUCCH format 2/2a/2b/3.

TABLE 7

| Normal cyclic prefix | Extended cyclic prefix |
|---|---|
| [1 1] | [1] |

Next, the PUCCH format 1/1a/1b will be described.

FIG. 11 illustrates a structure of an ACK/NACK channel for the case of a normal CP in a wireless communication system to which the present invention can be applied.

FIG. 11 illustrates a channel structure of a PUCCH intended for transmission of HARQ ACK/NACK signal without using CQI.

The confirmation response information (not scrambled) of 1 bit and 2 bits can be represented by a single HARQ ACK/NACK modulation symbol by using BPSK and QPSK modulation scheme, respectively. Acknowledgement can be encoded as '1' while non-acknowledgement can be encoded as '0'.

When a control signal is transmitted within an allocated band, two-dimensional spreading is applied to increase multiplexing capacity. In other words, to increase the number of UEs or control channels that can be multiplexed, frequency and time domain spreading are applied at the same time.

In order to spread the ACK/NACK signal in the frequency domain, a frequency domain sequence is used as a base sequence. For a frequency domain sequence, Zadoff-Chu (ZC) sequence, which is one of the CAZAC sequence, can be used.

In other words, for the case of the PUCCH format 1a/1b, the symbol modulated by using BPSK or QPSK scheme is multiplied with a CAZAC sequence (for example, ZC sequence) of length 12. For example, a modulation symbol d(0) is multiplied with the CAZAC sequence of length N, r(n), where n=0, 1, 2, . . . , N−1, to provide y(0), y(1), y(2), . . . , y(N−1). The y(0), y(1), . . . , y(N−1) symbols can be called a block of symbols.

In this way, as a different cyclic shift (CS) is applied to the base sequence, ZC sequence, multiplexing of different UEs or control channels can be implemented. The number of CS resources supported by SC-FDMA symbols meant for PUCCH RBs to transmit the HARQ ACK/NACK signal is set by the cell-specific, upper-layer signaling parameter $\Delta_{shift}^{PUCCH}$.

After multiplication of a modulation symbol with the CAZAC sequence, block-wise spreading employing an orthogonal sequence is applied. In other words, the ACK/NACK signal spread in the frequency domain is spread in the time domain by using the orthogonal spreading code. As the orthogonal spreading code (or orthogonal cover sequence) or orthogonal cover code (OCC), the Walsh-Hadamard sequence or Discrete Fourier Transform (DTF) sequence can be used. For example, the ACK/NACK signal can be spread through an orthogonal sequence of length 4 (w0, w1, w2, w3) with respect to four symbols. Also, the RS is also spread through an orthogonal sequence of length 2 or 3. And the above operation is called orthogonal covering (OC).

For the ACK/NACK information or CDM of a demodulation reference signal, orthogonal covering based on the Walsh mode or DRF matrix can be used.

A DFT matrix is an N×N square matrix (where N is a natural number).

A DFT matrix can be defined as shown in Eq. 1.

$$W = \left(\frac{\omega^{jk}}{\sqrt{N}}\right)_{j,k=0,\ldots,N-1} \quad [Eq.\ 1]$$

Equation 1 can be represented as a matrix form as shown in Eq. 2.

$$W = \frac{1}{\sqrt{N}} \begin{bmatrix} 1 & 1 & 1 & 1 & \cdots & 1 \\ 1 & \omega & \omega^2 & \omega^3 & \cdots & \omega^{N-1} \\ 1 & \omega^2 & \omega^4 & \omega^6 & \cdots & \omega^{2(N-1)} \\ 1 & \omega^3 & \omega^6 & \omega^9 & \cdots & \omega^{3(N-1)} \\ \vdots & \vdots & \vdots & \vdots & \ddots & \vdots \\ 1 & \omega^{N-1} & \omega^{2(N-1)} & \omega^{3(N-1)} & \cdots & \omega^{(N-1)(N-1)} \end{bmatrix} \quad [Eq.\ 2]$$

$$\omega = e^{-\frac{2\pi i}{N}}$$

in Eq. 2 denotes the primitive N-th root of unity.

A 2-point, 4-point, and 8-point DFT matrix are shown in Eqs. 3, 4, and 5, respectively.

$$\frac{1}{\sqrt{2}} \begin{bmatrix} 1 & 1 \\ 1 & -1 \end{bmatrix} \quad [Eq.\ 3]$$

$$W = \frac{1}{\sqrt{4}} \begin{bmatrix} 1 & 1 & 1 & 1 \\ 1 & -i & -1 & i \\ 1 & -1 & 1 & -1 \\ 1 & i & -1 & -i \end{bmatrix} \quad [Eq.\ 4]$$

$$W = \frac{1}{\sqrt{8}} \begin{bmatrix} \omega^0 & \omega^0 & \omega^0 & \cdots & \omega^0 \\ \omega^0 & \omega^1 & \omega^2 & \cdots & \omega^7 \\ \omega^0 & \omega^2 & \omega^4 & \cdots & \omega^{14} \\ \omega^0 & \omega^3 & \omega^6 & \cdots & \omega^{21} \\ \omega^0 & \omega^4 & \omega^8 & \cdots & \omega^{28} \\ \omega^0 & \omega^5 & \omega^{10} & \cdots & \omega^{35} \\ \vdots & \vdots & \vdots & \ddots & \vdots \\ \omega^0 & \omega^7 & \omega^{14} & \cdots & \omega^{49} \end{bmatrix} \quad [Eq.\ 5]$$

In the case of a normal CP, 3 consecutive SC-FDMA symbols located in the middle of the 7 SC-FDMA symbols included within one slot carry the reference signal (RS), and the remaining 4 SC-FDMA symbols carry the ACK/NACK signal. On the other hand, in the case of an extended CP, 2 consecutive symbols in the middle thereof can carry the RS. The number and the position of the symbols used for the RS can be varied according to a control channel, and the number and the position of the symbols used for the ACK/NACK signal can also be changed according to the control channel.

For the case of normal ACK/NACK information, the Walsh-Hadamard sequence of length 4 is used, and for the case of shortened ACK/NACK information and reference signal (RS), the DFT sequence of length 3 is used.

For the reference signal (RS) in the case of the extended CP, the Hadamard sequence of length 2 is used.

Table 8 shows an orthogonal sequence (OC) [w(0) . . . w($N_{SF}^{PUCCH}$−1)] of length 4 for the PUCCH format 1a/1b.

TABLE 8

| Sequence index $n_{oc}^{(\tilde{p})}(n_s)$ | Orthogonal sequences [w(0) . . . w($N_{SF}^{PUCCH}$ − 1)] |
|---|---|
| 0 | [+1 +1 +1 +1] |
| 1 | [+1 −1 +1 −1] |
| 2 | [+1 −1 −1 +1] |

Table 9 shows an orthogonal sequence [w(0) . . . w($N_{SF}^{PUCCH}$−1)] of length 3 for the PUCCH format 1a/1b.

TABLE 9

| Sequence index $n_{oc}^{(\tilde{p})}(n_s)$ | Orthogonal sequences $[w(0) \ldots w(N_{SF}^{PUCCH} - 1)]$ |
| --- | --- |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Table 10 shows an orthogonal sequence (OC) $[\overline{w}^{(\tilde{p})}(0) \ldots \overline{w}^{(\tilde{p})}(N_{RS}^{PUCCH}-1)]$ for the RS for the PUCCH format 1/1a/1b.

TABLE 10

| Sequence index $\overline{n}_{oc}^{(\tilde{p})}(n_s)$ | Normal cyclic prefix | Extended cyclic prefix |
| --- | --- | --- |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

As described above, a plurality of UEs can be multiplexed through code division multiplexing (CDM) scheme by using the CS resource in the frequency domain but OC resource in the time domain. In other words, the ACK/NACK information and RS for a large number of UEs can be multiplexed on the same PUCCH RB.

With respect to the time domain spreading CDM, the number of spreading codes supporting the ACK/NACK information is limited by the number of RS symbols. In other words, since the number of SC-FDMA symbols for RS transmission is smaller than the number of SC-FDMA symbols for ACK/NACK information transmission, multiplexing capacity of RS becomes smaller than that of ACK/NACK information.

For example, in the case of a normal CP, ACK/NACK information can be transmitted from 4 symbols. In the case of an extended CP, 3 orthogonal spreading codes rather than 4 can be used for the ACK/NACK information; this is so because the number of RS transmission symbols is limited to 3 and only three orthogonal spreading codes can be used for the RS.

Suppose in a subframe with a normal CP, 3 symbols from one slot are used for RS transmission and 4 symbols are used for ACK/NACK information transmission. If 6 cyclic shifts are available in the frequency domain and 3 orthogonal cover resources in the time domain can be used, the HARQ confirmation responses from a total of 18 different UEs can be multiplexed within one PUCCH RB. Similarly, suppose in a subframe with an extended CP, 2 symbols from one slot are used for RS transmission and 4 symbols are used for ACK/NACK information transmission. If 6 cyclic shifts are available in the frequency domain and 2 orthogonal cover resources in the time domain can be used, the HARQ confirmation responses from a total of 12 different UEs can be multiplexed within one PUCCH RB.

Next, the PUCCH format 1 will be described. A scheduling request (SR) is transmitted in such a way that a UE may or may not request scheduling. An SR channel re-uses the ACK/NACK channel structure for the PUCCH format 1a/1b and configured according to the On-Off Keying (OOK) scheme based on the ACK/NACK channel design. A reference signal is not transmitted through the SR channel. Therefore, in the case of a normal CP, a sequence of length 7 is used while in the case of an extended CP, a sequence of length 6 is used. For the SR and ACK/NACK, a different cyclic shift or orthogonal cover can be allocated.

FIG. 12 illustrates a method for multiplexing ACK/NACK and SR in a wireless communication system to which the present invention can be applied.

The structure of the SR PUCCH format 1 is the same as the structure of the ACK/NACK PUCCH format 1a/1b of FIG. 12.

A scheduling request (SR) is transmitted through the OOK scheme. More specifically, the UE transmits an SR which has a modulation symbol d(0)=1 to request PUSCH resources (positive SR) but transmits nothing if not requesting scheduling (negative SR). Since the PUCCH structure for ACK/NACK is re-used for SR, different resource indices within the same PUCCH region (namely, combinations of different cyclic shifts and orthogonal codes) can be allocated to the SR (PUCCH format 1) or HARQ ACK/NACK (PUCCH format 1a/1b). The PUCCH resource index to be used by the UE for SR transmission is set by UE-specific upper layer signaling.

In case the UE needs to transmit a positive SR from a subframe scheduled for CQI transmission, the UE is allowed to drop CQI and to transmit the SR only. Similarly, if the UE needs to transmit the SR and the SRS at the same time, the UE is allowed to drop the CQI and to transmit the SR only.

In case the SR and the ACK/NACK are generated in the same subframe, the UE transmits the ACK/NACK signal on the SR PUCCH resource allocated for positive SR. In the case of negative SR, the UE transmits the ACK/NACK signal on the ACK/NACK resources allocated.

FIG. 12 shows constellation mapping for simultaneous transmission of an ACK/NACK signal and an SR. More specifically, FIG. 12 illustrates that NACK signal (or, in the case of two MIMO codewords, NACK, NACK) is mapped being modulated to +1. Accordingly, occurrence of discontinuous transmission (DTX) is treated as NACK.

For SR and persistent scheduling, the ACK/NACK resources comprising CS, OC, and physical resource blocks (PRBs) can be allocated to the UE through radio resource control (RRC). On the other hand, for the purpose of dynamic ACK/NACK transmission and non-persistent scheduling, ACK/NACK resources can be allocated implicitly to the UE through the lowest CCE index of the PUCCH corresponding to the PDSCH.

The UE can transmit the SR if resources for uplink data transmission are needed. In other words, transmission of the SR is event-triggered.

The SR PUCCH resources are configured by upper layer signaling except for the case the SR is transmitted together with the HARQ ACK/NACK by using the PUCCH format 3. In other words, the SR PUCCH resources are configured by the ScheduleingRequestConfig information element transmitted through the radio resource control (RRC) message (for example, an RRC connection reconfiguration message).

Table 11 shows the ScheduleingRequestConfig information element.

TABLE 11

-- ASN1START

SchedulingRequestConfig ::=    CHOICE {

TABLE 11-continued

```
    release                        NULL,
    setup                          SEQUENCE {
        sr-PUCCH-ResourceIndex         INTEGER (0..2047),
        sr-ConfigIndex                 INTEGER (0..157),
        dsr-TransMax                   ENUMERATED {
                                           n4, n8, n16, n32, n64, spare3, spare2,
spare1}
    }
}
SchedulingRequestConfig-v1020 ::=    SEQUENCE {
    sr-PUCCH-ResourceIndexP1-r10         INTEGER (0..2047) OPTIONAL
}
-- ASN1STOP
```

Table 12 shows the fields included in the SchedulingRequestConfig information element.

TABLE 12

SchedulingRequestConfig field descriptions dsr-TransMax
Parameter for SR transmission. n4 represents four times of transmission, n8 eight times of transmission, and so on.
sr-ConfigIndex
Parameter ($I_{SR}$). 156 and 157 values are not defined in the release 8.
sr-PUCCH-ResourceIndex, sr-PUCCH-ResourceIndexP1
Parameters for antenna port p0 and 01, respectively ($n_{PUCCH, SRI}^{(1, p)}$). E-UTRAN configures sr-PUCCH-ResourceIndexP1 only when sr-PUCCHResourceIndex is set up.

With reference to FIG. 12, the UE receives sr-PUCCH-ResourceIndex parameter for SR transmission through an RRC message and sr-ConfigIndex parameter ($I_{SR}$) indicating the SR configuration index. The sr-ConfigIndex parameter can be used to configure $SR_{PERIODICITY}$ which indicates the period at which the SR is transmitted and $N_{OFFSET,SR}$ which indicates a subframe from which the SR is transmitted. In other words, the SR is transmitted from a particular subframe repeated periodically according to $I_{SR}$ given by the upper layer. Also, subframe resources and CDM/FDM (Frequency Division Multiplexing) resources can be allocated to the resources for SR.

Table 13 represents an SR transmission period and an SR subframe offset according to an SR configuration index.

TABLE 13

| SR configuration Index $I_{SR}$ | SR periodicity (ms) $SR_{PERIODICITY}$ | SR subframe offset $N_{OFFSET, SR}$ |
|---|---|---|
| 0-4 | 5 | $I_{SR}$ |
| 5-14 | 10 | $I_{SR}$ − 5 |
| 15-34 | 20 | $I_{SR}$ − 15 |
| 35-74 | 40 | $I_{SR}$ − 35 |
| 75-154 | 80 | $I_{SR}$ − 75 |
| 155-156 | 2 | $I_{SR}$ − 155 |
| 157 | 1 | $I_{SR}$ − 157 |

Buffer Status Reporting (BSR)

FIG. 13 illustrates an MAC PDU used by an MAC entity in a wireless communication system to which the present invention can be applied.

With reference to FIG. 13, the MAC PDU includes an MAC header, at least one MAC service data unit (SDU), and at least one MAC control element; and may further comprise padding. Depending on the situation, at least one of the MAC SDU and the MAC control element may not be included in the MAC PDU.

As shown in FIG. 13, the MAC control element usually precedes the MAC SDU. And the size of the MAC control element can be fixed or varied. In case the size of the MAC control element is variable, whether the size of the MAC control element has been increased can be determined through an extended bit. The size of the MAC SDU can also be varied.

The MAC header can include at least one or more sub-headers. At this time, at least one or more sub-headers included in the MAC header correspond to the MAC SDU, MAC control element, and padding, respectively, which the order of the sub-headers is the same as the disposition order of the corresponding elements. For example, as shown in FIG. 10, if the MAC PDU includes an MAC control element 1, an MAC control element 2, a plurality of MAC SDUs, and padding, sub-headers can be disposed in the MAC header so that a sub-header corresponding to the MAC control element 1, a sub-header corresponding to the MAC control element 2, a plurality of sub-headers corresponding respectively to the plurality of MAC SDUs, and a sub-header corresponding to padding can be disposed according to the corresponding order.

The sub-header included in the MAC header, as shown in FIG. 10, can include 6 header fields. More specifically, the sub-header can include 6 header fields of R/R/E/LCID/F/L.

As shown in FIG. 10, for the sub-header corresponding to the MAC control element of a fixed size and the sub-header corresponding to the last one among the data fields included in the MAC PDU, sub-headers including 4 header fields can be used. Therefore, in case a sub-header includes 4 fields, the four fields can be R/R/E/LCID.

FIGS. 14 and 15 illustrate a sub-header of an MAC PDU in a wireless communication system to which the present invention can be applied.

In the following, each field is described with reference to FIGS. 14 and 15.

1) R: Reserved bit, not used.

2) E: Extended bit, indicating whether the element corresponding to a sub-header is extended. For example, if E field is '0', the element corresponding to the sub-header is terminated without repetition; if E field is '1', the element corresponding to the sub-header is repeated one more time and the length of the element is increased twice of the original length.

3) LCID: Logical Channel Identification. This field is used for identifying a logical channel corresponding to the MAC SDU or identifying the corresponding MAC control element and padding type. If the MAC SDU is related to a sub-header, this field then indicates a logical channel which the MAC SDU corresponds to. If the MAC control element is related to a sub-header, then this field can describe what the MAC control element is like.

Table 14 shows the LCID values for DL-SCH.

TABLE 14

| Index | LCID values |
| --- | --- |
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Table 15 shows LCID values for UL-SCH.

TABLE 15

| Index | LCID values |
| --- | --- |
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In the LTE/LTE-A system, a UE can report its buffer state to the network by setting an index value for any of a truncated BSR in the LCID field, a short BSR, and a long BSR.

The index values and a mapping relationship of the LCID values of Tables 14 and 15 are shown for an illustrative purpose, and the present invention is not limited to the example.

4) F: Format field. Represents the size of the L field

5) L: Length field. Represents the size of the MAC SDU corresponding to a sub-header and the size of the MAC control element. If the size of the MAC SDU corresponding to a sub-header or the size of the MAC control element is equal to or smaller than 127 bits, 7 bits of the L field can be used (FIG. 14(a)) and 15 bits of the L field can be used for the other cases (FIG. 14(b)). In case the size of the MAC control element varies, the size of the MAC control element can be defined through the L field. In case the size of the MAC control element is fixed, the F and the L field may be omitted as shown in FIG. 15 since the size of the MAC control element can be determined without defining the size of the MAC control element through the L field.

FIG. 16 illustrates a format of an MAC control element for reporting a buffer state in a wireless communication system to which the present invention can be applied.

In case the truncated BSR and short BSR are defined in the LCID field, the MAC control element corresponding to a sub-header can be configured to include a logical channel group identification (LCG ID) field and a buffer size field indicating a buffer state of the logical channel group as shown in FIG. 16(a). The LCG ID field is intended to identify a logical channel group to which to report a buffer state and can have the size of two bits.

The buffer size field is intended to identify the total amount of data available for all of the logical channels belonging to a logical channel group after the MAC PDU is created. The available data include all of the data that can be transmitted from the RLC layer and the PDCP layer, and the amount of data is represented by the number of bytes. The buffer size field can have the size of 6 bits.

In case a long BSR is defined for the LCID field of a sub-header, the MAC control element corresponding to a sub-header can include 4 buffer size fields indicating buffer states of the four groups having LCG IDs ranging from 0 to 3 as shown in FIG. 16(b). Each buffer size field can be used to identify the total amount of data available for each logical channel group.

Carrier Aggregation in General

Communication environments considered in the embodiments of the present invention includes all of multi-carrier supporting environments. In other words, a multi-carrier system or a carrier aggregation system according to the present invention refers to the system utilizing aggregation of one or more component carriers having bandwidth narrower than target bandwidth to establish a broadband communication environment.

A multi-carrier according to the present invention refers to aggregation of carriers, and the carrier aggregation in this sense refers to not only the aggregation of contiguous carriers but also the aggregation of non-contiguous carriers. Also, the numbers of component carriers aggregated for downlink and uplink transmission can be set differently from each other. The case where the number of downlink component carriers (hereinafter, it is called 'DL CC') is the same as the number of uplink component carriers (hereinafter, it is called 'UL CC') is called symmetric aggregation, whereas it is called asymmetric aggregation otherwise. The term of carrier aggregation may be used interchangeably with bandwidth aggregation and spectrum aggregation.

Carrier aggregation composed of a combination of two or more component carriers is intended to support bandwidth of up to 100 MHz for the case of the LTE-A system. When one or more carriers having narrower bandwidth than target bandwidth are combined, the bandwidth of the carrier to be combined can be limited to the bandwidth defined by an existing system to maintain compatibility with the existing IMT system. For example, while the existing system supports bandwidth of 1.4, 3, 5, 10, 15, and 20 MHz, the 3GPP LTE-A system can support bandwidth larger than 20 MHz by using a combination of the predefined bandwidth to maintain compatibility with the existing system. Also, a carrier aggregation system according to the present invention may support carrier aggregation by defining new bandwidth independently of the bandwidth used in the existing system.

The LTE-A system introduces a concept of a cell for management of radio resources.

The carrier aggregation environment can be referred to as a multiple cell environment. A cell is defined as a combination of a pair of a DL CC and an UL CC, but the UL CC is not an essential element. Therefore, a cell can be composed of downlink resources only or a combination of downlink and uplink resources. In case a particular UE is linked to only one configured serving cell, one DL CC and one UL CC are employed. However, if the particular UE is linked to two or more configured serving cells, as many DL CCs as the number of cells are employed while the number of UL CCs can be equal to or smaller than the number of DL CCs.

Meanwhile, the DL CCs and the UL CCs can be composed in the opposite way. In other words, in case a particular UE is linked to a plurality of configured serving cells, a carrier aggregation environment which has more UL CCs than DL CCs can also be supported. In other words, carrier aggregation can be understood as a combination of two or more cells having different carrier frequencies (center frequencies of the cells). At this time, the term of 'cell' should be distinguished from the 'cell' usually defined as a region covered by an eNB.

The LTE-A system defines a primary cell (PCell) and a secondary cell (SCell). A PCell and an SCell can be used as a serving cell. A UE being in an RRC_CONNECTED state but not being configured for carrier aggregation or not supporting carrier aggregation can be linked to one or more serving cells, and the entire serving cells include a PCell and one or more SCells.

A serving cell (PCell and SCell) can be configured through an RRC parameter. PhysCellId is a physical layer identifier of a cell, having an integer value ranging from 0 to 503. SCellIndex is a short identifier used for identifying an SCell, having an integer value ranging from 1 to 7. ServCellIndex is a short identifier used for identifying a serving cell (PCell or SCell), having an integer value ranging from 0 to 7. The value of 0 is applied to a PCell, and SCellIndex is pre-assigned to be applied to an SCell. In other words, the cell which has the smallest cell ID (or cell index) of ServCellIndex becomes the PCell.

A PCell refers to a cell operating on a primary frequency (or a primary CC). A PCell can be used for an UE to carry out initial connection establishment or connection re-establishment; a PCell may refer to the cell indicated during a handover procedure. Also, a PCell refers to the cell which plays a central role for control-related communication among configured serving cells in a carrier aggregation environment. In other words, a UE is capable of receiving and transmitting a PUCCH only through its own PCell; also, the UE can obtain system information or modify a monitoring procedure only through the PCell. The E-UTRAN (Evolved Universal Terrestrial Radio Access Network) may change only the PCell by using an RRC connection reconfiguration message (RRCConnectionReconfiguration) of an upper layer including mobility control information (mobilityControlInfo) so that the UE supporting carrier aggregation environments can carry out a handout procedure.

An SCell refers to a cell operating on a secondary frequency (or a secondary CC). For a particular UE, only one PCell is allocated, but one or more SCells can be allocated. An SCell can be composed after configuration for an RRC connection is completed and can be used to provide additional radio resources. A PUCCH does not exist in the remaining cells except for PCells among the serving cells configured for a carrier aggregation environment, namely, SCells. When adding an SCell to a UE supporting a carrier aggregation environment, the E-UTRAN can provide all of the system information related to the operation of a cell in the RRC_CONNECTED state through a dedicated signal. Modification of system information can be controlled according to release and addition of a related SCell, and at this time, an RRC connection reconfiguration message (RRCConnectionReconfiguration) message of an upper layer can be used. The E-UTRAN, instead of broadcasting a signal within an SCell, may carry out dedicated signaling using parameters different for each UE.

After the initial security activation process is started, the E-UTRAN may form a network including one or more SCells in addition to a PCell defined in the initial step of a connection establishment process. In a carrier aggregation environment, a PCell and an SCell can operate as an independent component carrier. In the embodiment below, a primary component carrier (PCC) can be used in the same context as the PCell, while a secondary component carrier (SCC) can be used in the same context as the SCell.

FIG. 17 illustrates one example of a component carrier and carrier aggregation in a wireless communication system to which the present invention can be applied.

FIG. 17(a) shows a single carrier structure defined in the LTE system. Two types of component carriers are used: DL CC and UL CC. A component carrier can have frequency bandwidth of 20 MHz.

FIG. 17(b) shows a carrier aggregation structure used in the LTE A system. FIG. 17(b) shows a case where three component carriers having frequency bandwidth of 20 MHz are aggregated. In this example, 3 DL CCs and 3 UL CCs are employed, but the number of DL CCs and UL CCs is not limited to the example. In the case of carrier aggregation, the UE is capable of monitoring 3 CCs at the same time, capable of receiving a downlink signal/data and transmitting an uplink signal/data.

If a particular cell manages N DL CCs, the network can allocated M (M≤N) DL CCs to the UE. At this time, the UE can monitor only the M DL CCs and receive a DL signal from the M DL CCs. Also, the network can assign priorities for L (L≤M≤N) DL CCs so that primary DL CCs can be allocated to the UE; in this case, the UE has to monitor the L DL CCs. This scheme can be applied the same to uplink transmission.

Linkage between a carrier frequency of downlink resources (or DL CC) and a carrier frequency of uplink resources (or UL CC) can be designated by an upper layer message such as an RRC message or system information. For example, according to the linkage defined by system information block type 2 (SIB2), a combination of DL resources and UL resources can be determined. More specifically, the linkage may refer to a mapping relationship between a DL CC through which a PDCCH carrying an UL grant is transmitted and an UL CC that uses the UL grant; or a mapping relationship between a DL CC (or an UL CC) through which data for HARQ signal are transmitted and an UL CC (or a DL CC) through which a HARQ ACK/NACK signal is transmitted.

Uplink Resource Allocation Procedure

In the case of the 3GPP LTE/LTE-A system, a method for data transmission and reception based on scheduling of an eNB is used to maximize utilization of radio resources. This again implies that in case a UE has data to transmit, the UE requests the eNB to allocate uplink resources in the first place and is capable of transmitting data by using only the uplink resources allocated by the eNB.

FIG. 18 illustrates an uplink resource allocation process of a UE in a wireless communication system to which the present invention can be applied.

For efficient use of radio resources in uplink transmission, an eNB needs to know which data and how much of the data to transmit to each UE. Therefore, the UE transmits to the eNB the information about uplink data that the UE attempts to transmit directly, and the eNB allocates uplink resources to the corresponding UE in accordance to the UE's transmission. In this case, the information about uplink data that the UE transmits to the eNB is the amount of uplink data stored in the UE's buffer, which is called buffer status report (BSR). When radio resources on the PUSCH are allocated during a current TTI and a reporting event is triggered, the UE transmits the BSR by using the MAC control element.

FIG. 18(a) illustrates an uplink resource allocation process for actual data in case the uplink radio resources for buffer status reporting are not allocated to the UE. In other words, in the case of a UE making a transition from the DRX mode to an active mode, since no data resources are allocated beforehand, the UE has to request resources for uplink data, starting with SR transmission through the PUCCH, and in this case, an uplink resource allocation procedure of five steps is employed.

FIG. 18(a) illustrates the case where the PUSCH resources for transmitting BSR are not allocated to the UE, and the UE first of all transmits a scheduling request (SR) to the eNB to receive PUSCH resources S1801.

The scheduling request is used for the UE to request the eNB to allocate the PUSCH resources for uplink transmission in case radio resources are not scheduled on the PUSCH during a current TTI although a reporting event has occurred. In other words, when a regular BSR has been triggered but uplink radio resources for transmitting the BSR to the eNB are not allocated to the UE, the UE transmits the SR through the PUCCH. Depending on whether the PUCCH resources for SR have been configured, the UE may transmit the SR through the PUCCH or starts a random access procedure. More specifically, the PUCCH resources through the SR can be transmitted are set up by an upper layer (for example, the RRC layer) in a UE-specific manner, and the SR configuration include SR periodicity and SR sub-frame offset information.

If the UE receives from the eNB an UL grant with respect to the PUSCH resources for BSR transmission S1803, the UE transmits the BSR to the eNB, which has been triggered through the PUSCH resources allocated by the UL grant S1805.

By using the BSR, the eNB checks the amount of data for the UE to actually transmit through uplink transmission and transmits to the UE an UL grant with respect to the PUSCH resources for transmission of actual data S1807. The UE, which has received the UL grant meant for transmission of actual data, transmits to the eNB actual uplink data through the allocated PUSCH resources S1809.

FIG. 18(b) illustrates an uplink resource allocation process for actual data in case the uplink radio resources for buffer status reporting are allocated to the UE.

FIG. 18(b) illustrates the case where the PUSCH resources for BSR transmission have already been allocated to the UE; the UE transmits the BSR through the allocated PUSCH resources and transmits a scheduling request to the eNB along with the BSR transmission S1811. Next, by using the BSR, the eNB check the amount of data that the UE actually transmits through uplink transmission and transmits to the UE an UL grant with respect to the PUSCH resources for transmission of actual data S1813. The UE, which has received an UL grant for transmission of actual data, transmits actual uplink data to the eNB through the allocated PUSCH resources S1815.

FIG. 19 illustrates latency in a C-plane required in the 3GPP LTE-A system to which the present invention can be applied.

With reference to FIG. 19, the 3GPP LTE-A standard requires that transition time from the IDLE mode (the state where an IP address is assigned) to the connected mode is less than 50 ms. At this time, the transition time includes setting time (which excludes S1 transmission delay time) for the user plane (U-Plane). Also, the transition time from the dormant state to the active state within the connected mode is required to be less than 10 ms.

Transition from the dormant state to the active state can be generated according to the following four scenarios.

Uplink initiated transition, synchronized
Uplink initiated transition, unsynchronized
Downlink initiated transition, synchronized
Downlink initiated transition, unsynchronized FIG. 20 illustrates transition time of a synchronized UE from a dormant state to an active state required in the 3GPP LTE-A system to which the present invention can be applied.

FIG. 20 illustrates the previous three steps of the uplink resource allocation procedure of FIG. 18 (the case where uplink radio resources for BSR are allocated). In the LTE-A system, delay time as shown in Table 16 is required for uplink resource allocation.

Table 16 shows transition time from the dormant state to the active state initiated by uplink transmission for a synchronized UE, required by the LTE-A system.

TABLE 16

| Component | Description | Time [ms] |
| --- | --- | --- |
| 1 | Average delay to next SR opportunity (1 ms/5 ms PUCCH cycle) | 0.5/2.5 |
| 2 | UE sends Scheduling Request | 1 |
| 3 | eNB decodes Scheduling Request and generates the Scheduling Grant | 3 |
| 4 | Transmission of Scheduling Grant | 1 |
| 5 | UE Processing Delay (decoding of scheduling grant + L1 encoding of UL data) | 3 |
| 6 | Transmission of UL data | 1 |
|  | Total delay | 9.5/11.5 |

With reference to FIG. 20 and Table 16, an average delay of 0.5 ms/2.5 ms is required due to the PUCCH period having 1 ms/5 ms PUCCH cycle, and 1 ms is required for the UE to transmit SR. And the eNB requires 3 ms to decode the SR and to generate a scheduling grant, and another 1 ms to transmit the scheduling grant. And the UE requires 3 ms to decode the scheduling grant and to encode uplink data in the L1 layer, and another 1 ms to transmit the uplink data.

Thus a total of 9.5/15.5 ms is required for the UE to complete the process of transmitting uplink data.

Random Access Channel (RACH) Procedure

FIG. 21a and FIG. 21b illustrate one example of a random access procedure in the LTE system.

The random access procedure is carried out during initial connection in the RRC_IDLE state, initial connection after radio link failure, handover which requires the random access procedure, and upon occurrence of uplink or downlink data requiring the random access procedure while in the RRC_CONNECTED state. Part of the RRC message such as the RRC connection request message, cell update message, and UTRAN registration area (URA) update message is also transmitted through the random access procedure. Logical channels such as a common control channel (CCCH), dedicated control channel (DCCH), and dedicated traffic channel (DTCH) can be mapped to a physical channel, random access channel (RACH). The RACH is mapped to a physical channel, physical random access channel (PRACH).

If the MAC layer of the UE commands the UE's physical layer to perform PRACH transmission, the UE's physical layer first selects one access slot and one signature and transmits a PRACH preamble through uplink transmission. The random access procedure is divided into a contention-based random access procedure and a non-contention based random access procedure.

FIG. 21a illustrates one example of a contention-based random access procedure, and FIG. 21b illustrates one example of a non-contention based random access procedure.

First, the contention-based random access procedure will be described with reference to FIG. 21a.

The UE receives information about random access from the eNB through system information and stores the received information. Afterwards, in case random access is needed, the UE transmits a random access preamble (which is also called a message 1) to the eNB S2101.

If the eNB receives a random access preamble from the UE, the eNB transmits a random access response message (which is also called a message 2) to the UE S2102. More specifically, downlink scheduling information about the random access response message, being CRC-masked with a random access-ratio network temporary identifier (RA-RNTI), can be transmitted on an L1 or L2 control channel (PDCCH). The UE, which has received a downlink scheduling signal masked with an RA-RNTI, can receive the random access response message from a physical downlink shared channel (PDSCH) and decode the received message. Afterwards, the UE checks the random access response message as to whether random access response information for the UE exists.

The UE can determine existence of random access response information by checking existence of a random access preamble ID (RAID) with respect to the preamble that the UE has transmitted.

The random access response information includes timing alignment (TA) indicating timing offset information for synchronization, radio resource allocation information used for uplink transmission, and a temporary C-RNTI for identifying UEs.

If receiving random access response information, the UE carries out uplink transmission (which is also called a message 3) to an uplink shared channel (UL-SCH) according to radio resource allocation information included in the response information S2103. At this time, uplink transmission may be described as scheduled transmission.

After receiving the uplink transmission from the UE, the eNB transmits a message for contention resolution (which is also called a message 4) to the UE through a downlink shared channel (DL-SCH) S2104.

Next, a non-contention based random access procedure will be described with reference to FIG. 21b.

Before the UE transmits a random access preamble, the eNB allocates a non-contention random access preamble to the UE S2111.

The non-contention random access preamble can be allocated through a handover command or dedicated signaling such as signaling through the PDCCH. In case non-contention random access preamble is allocated to the UE, the UE transmits the allocated non-contention random access preamble to the eNB S2112.

Afterwards, similarly to the S2102 step of the contention-based random access procedure, the UE can transmit a random access response (which is also called a message 2) to the UE S2113.

Although the HARQ is not applied for a random access response during the random access procedure described above, the HARQ can be applied for uplink transmission with respect to a random access response or a message for contention resolution. Therefore, the UE doesn't have to transmit ACK or NACK signal for the case of the random access response.

Uplink Reference Signal

FIG. 22 illustrates another example of a structure of an uplink subframe.

With reference to FIG. 22, the UE transmits a sounding reference signal periodically or non-periodically to estimate a channel for an uplink sub-band excluding the band in which the PUSCH is transmitted or to obtain information of a channel corresponding to the whole uplink bandwidth (wide band). The period of SRS transmission is determined through upper layer signaling; transmission of a non-periodic sounding reference signal is specified by the eNB by using the 'SRS request' field of the PDCCH uplink/downlink DCI format or carried out as the eNB transmits a triggering message. As shown in FIG. 22, the region to which the sounding reference signal can be transmitted within a subframe is the interval containing the SC-FDMA symbol located at the last position on the time axis within the subframe. The sounding reference signals of various UEs transmitted to the last SC-FDMA symbol of the same subframe can be identified according to the respective frequencies. Different from the PUSCH, a sounding reference signal does not carry out DFT (Discrete Fourier Transform) calculations for conversion to an SC-FDMA symbol and is transmitted without using a precoding matrix employed by the PUSCH.

Likewise, the region to which a demodulation reference signal (DMRS) is transmitted within a subframe is the interval containing the SC-FDMA symbol located at the center of each slot on the time axis and in the same way, the DMRS is transmitted through a data transmission band in the frequency domain. For example, for a subframe to which a normal cyclic shift is applied, the DMRS is transmitted from the 4-th SC-FDMA symbol and the 11-th SC-FDMA symbol.

The DMRS can be combined with transmission of the PUSCH or the PUCCH. The sounding reference signal is a reference signal that the UE transmits to the eNB for uplink scheduling. The eNB estimates an uplink channel through the received sounding reference signal and uses the estimated uplink channel for uplink scheduling. The sounding reference signal is not combined with transmission of the PUSCH or the PUCCH. The same type of a base sequence can be used for the DMRS and the sounding reference signal. Meanwhile, the precoding matrix applied to the DMRS for uplink multi-antenna transmission can be the same as the precoding matrix applied to the PUSCH.

FIG. 23 illustrates a signal processing procedure for transmitting an uplink reference signal.

As shown in FIG. 23, data generate a signal in the time domain and are transmitted through IFFT after frequency mapping through a DFT precoder. On the other hand, a reference signal does not go through the process employing the DFT precoder. More specifically, right after the reference signal is generated in the frequency domain S2310, the reference signal goes through a localized mapping process S2320, an IFFT process S2330, and a cyclic prefix attach process S2340 sequentially, after which the reference signal is transmitted.

FIG. 24 illustrates a structure of a subframe for transmitting demodulation reference signal (DMRS).

FIG. 24(a) illustrates a structure of a subframe for transmitting a DMRS for the case of a normal CP, and FIG. 24(b) illustrates a structure of a subframe for transmitting a DMRS for the case of an extended CP. With reference to FIG. 24(a), in the case of a normal CP, a DMRS is transmitted through the 4-th and the 11-th SC-FDMA symbols; with reference to FIG. 24(b), in the case of an extended CP, the DMRS is transmitted through the 3-rd and the 9-th SC-FDMA symbol.

Demodulation Reference Signal with Respect to PUSCH

A reference signal with respect to the PUSCH is determined as follows.

The reference signal sequence $r_{PUSCH}^{(\lambda)}(\cdot)$ with respect to the PUSCH corresponds to a layer index and defined by the following Eq. 6.

$$r_{PUSCH}^{(\lambda)}(m \cdot M_{sc}^{RS}+n) = w^{(\lambda)}(m) r_{u,v}^{(\alpha_\lambda)}(n), \quad [\text{Eq. 6}]$$

where m and n are given as $$m = 0, 1$$
$$n = 0, \ldots, M_{sc}^{RS} - 1,$$

and $M_{sc}^{RS} = M_{sc}^{PUSCH}$.

In case an upper layer parameter 'Activate-DMRS-with OCC' is not set up or a temporary C-RNTI is used for transmitting the DCI related to the most recent uplink transmission, an orthogonal sequence $w^{(\lambda)}(m)$ is set so that $[w^\lambda(0) \ w^\lambda(1)] = [1 \ 1]$ to comply with the DCI format 0. On the other hand, the orthogonal sequence may be set up as shown in Table 17 according to a cyclic shift field included in the DCI related to the most recent uplink transmission with respect to a transport block related to the transmission of the corresponding PUSCH.

$[w^\lambda(0) \ w^\lambda(1)]$ represents an orthogonal sequence corresponding to a layer index $\lambda$; in particular, $w^{(\lambda)}(0)$ corresponds to a value applied to the first slot of the layer index $\lambda$, and $w^{(\lambda)}(1)$ corresponds to a value applied to the second slot of the layer index $\lambda$.

Table 17 shows a correspondence relationship between a cyclic shift field within the DCI related to uplink transmission and $n_{DMRS,\lambda}^{(2)}$ and $[w^\lambda(0) \ w^\lambda(1)]$.

TABLE 17

| Cyclic Shift Field in uplink-related | $n_{DMRS,\lambda}^{(2)}$ | | | | $[w^{(\lambda)}(0) \ w^{(\lambda)}(1)]$ | | | |
|---|---|---|---|---|---|---|---|---|
| DCI format [3] | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0 | 6 | 3 | 9 | [1 1] | [1 1] | [1 -1] | [1 -1] |
| 001 | 6 | 0 | 9 | 3 | [1 -1] | [1 -1] | [1 1] | [1 1] |
| 010 | 3 | 9 | 6 | 0 | [1 -1] | [1 -1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 -1] | [1 -1] | [1 -1] | [1 -1] |
| 110 | 10 | 4 | 1 | 7 | [1 -1] | [1 -1] | [1 -1] | [1 -1] |
| 111 | 9 | 3 | 0 | 6 | [1 1] | [1 1] | [1 -1] | [1 -1] |

The cyclic shift value $\alpha_\lambda$ within the slot $n_s$ is defined by the following Eq. 7, and $n_{cs,\lambda}$ is defined as shown in Eq. 8.

$$\alpha_\lambda = 2\pi n_{cs,\lambda}/12 \quad [\text{Eq. 7}]$$

$$n_{cs,\lambda} = (n_{DMRS}^{(1)} + n_{DMRS,\lambda}^{(2)} + n_{PN}(n_s)) \bmod 12, \quad [\text{Eq. 8}]$$

where $n_{DMRS}^{(1)}$ is determined by an upper layer parameter 'cyclicShift' and describes the correspondence relationship between the parameter value shown in Table 18 and $n_{DMRS}^{(1)}$.

TABLE 18

| cyclicShift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

$n_{DMRS,\lambda}^{(2)}$ is determined by a cyclic shift value for the DMRS field within the DCI related to the most recent uplink transmission of a transport block corresponding to the transmission of the PUSCH, and $n_{DMRS,\lambda}^{(2)}$ value is shown in Table 18.

With reference to Table 18, in case a downlink physical control channel (PDCCH) including the DCI related to uplink transmission is not transmitted on the same transmission block, or in case the initial PUSCH is semi-persistently scheduled in the same transport block, or in case the initial PUSCH is scheduled according to a random access response grant in the same transport block, $n_{DMRS}^{(1)}$ can have the value as shown in the first column of Table 18.

$n_{PN}(n_s)$ can be defined by the following Eq. 9.

$$n_{PN}(n_s) = \sum_{i=0}^{7} c(8 N_{symb}^{UL} \cdot n_s + i) \cdot 2^i, \quad [\text{Eq. 9}]$$

where c(i) is a pseudo-random sequence and is a cell-specific value. A pseudo-random sequence generator can be initialized to $$c_{init} = \left\lfloor \frac{N_{ID}^{cell}}{30} \right\rfloor \cdot 2^5 + f_{ss}^{PUSCH}$$

at the start of a radio frame.

The vector of a reference signal can be precoded as shown in Eq. 10.

$$\begin{bmatrix} \tilde{r}_{PUSCH}^{(0)} \\ \vdots \\ \tilde{r}_{PUSCH}^{(P-1)} \end{bmatrix} = W \begin{bmatrix} r_{PUSCH}^{(0)} \\ \vdots \\ r_{PUSCH}^{(v-1)} \end{bmatrix}, \quad [\text{Eq. 10}]$$

where P represents the number of antenna ports used for transmission of the PUSCH. When one antenna port is employed for transmission of the PUSCH, P=1, W=1, and υ=1. In the case of spatial multiplexing, P=2 or P=4, and the precoding matrix W can be used in the same manner as used for precoding of the PUSCH within the same subframe.

A physical mapping method for an uplink reference signal in the PUSCH transmission is as follows.

For each antenna port used for PUSCH transmission, the $\tilde{r}_{PUSCH}^{(\tilde{p})}(\cdot)$ sequence is multiplied with an amplitude scaling factor $\beta_{PUSCH}$ and starting from $\tilde{r}_{PUSCH}^{(\tilde{p})}(0)$, mapped to a sequence. The relationship between a physical resource block set used for the mapping process and the index $\tilde{P}$ and the antenna port number P is the same as the transmission of the corresponding PUSCH. For a resource element (RE) with an index (k,l), in the case of a normal CP, l=3; in the case of an extended CP, l=2; and $\tilde{r}_{PUSCH}^{(\tilde{p})}(\cdot)$ is mapped in an increasing order of k and then mapped in an increasing order of the slot number.

Uplink/Downlink Scheduling in the TDD System

Since downlink/uplink subframe structure in the TDD system is different for each uplink-downlink configuration, transmission time of the PUSCH and PHICH is set up differently according to the configuration, and transmission time of the PUSCH and PHICH is set up differently according to the subframe index (or number).

The LTE system defines the uplink/downlink timing relationship among the PUSCH, the PDCCH preceding the PUSCH, and the PHICH through which a downlink HARQ ACK/NACK signal corresponding to the PUSCH is transmitted.

Table 19 shows transmission timing of the PDCCH and the PUSCH corresponding to the PDCCH according to uplink-downlink configurations.

TABLE 19

| TDD UL/DL Config- | subframe number n | | | | | | | | | |
|---|---|---|---|---|---|---|---|---|---|---|
| uration | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | 4 | | | | | 4 | | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

With reference to Table 19, in the case of uplink-downlink configurations 1 to 6, when the UE receives an UL grant through the PDCCH from the eNB in the n-th downlink subframe or needs to re-transmit the PUSCH after receiving the PHICH, the UE transmits the PUSCH, according to the downlink subframe index with which the PDCCH (or PHICH) has been transmitted, from the (n+k)-th uplink subframe corresponding to the index. At this time, the k value follows as shown in Table 19.

In the case of uplink-downlink configuration 0, the UE carries out transmission of the PUSCH according to the relationship shown in Table 1 indicated by $I_{PHICH}$ which is determined by the uplink index value within the uplink DCI format, the number of a downlink subframe from which the PHICH is transmitted, and the number of an uplink subframe transmitted to an upper layer or from which the PUSCH is transmitted. The UE may transmit the PUSCH from the (n+7)-th uplink subframe; or the UE may transmit the PUSCH to both of the uplink subframe specified according to Table 19 and the (n+7)-th uplink subframe.

Meanwhile, if the UE receives the PHICH including the HARQ ACK/NACK signal from the eNB at a downlink subframe i, the PHICH corresponds to the PUSCH that the UE transmits at an uplink subframe i−k. At this time, the k value is shown in Table 20.

Table 20 shows a transmission timing relationship of the PUSCH and the PHICH corresponding to the PUSCH according to uplink-downlink configurations.

TABLE 20

| TDD UL/DL Config- | subframe number i | | | | | | | | | |
|---|---|---|---|---|---|---|---|---|---|---|
| uration | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | 6 | 6 | |
| 4 | | | | | | | | 6 | 6 | |
| 5 | | | | | | | | 6 | | |
| 6 | 6 | 4 | | | | 7 | 4 | | | 6 |

In the of uplink-downlink configurations 1 to 6 or in the case of uplink-downlink configuration 0 and $I_{PHICH}$=0, if the UE receives the PHICH transmitting a HARQ-ACK signal from the eNB at a subframe i, the PHICH corresponds to the PUSCH that the UE transmits at a subframe i−k. On the other hand, in the uplink-downlink configuration 0 and $I_{PHICH}$=1, if the UE receives the PHICH transmitting the HARQ-ACK signal from the eNB at the subframe i, the PHICH corresponds to the PUSCH that the UE transmits at a subframe i−6.

If the UE transmits a transport block to the eNB through the PUSCH subframe corresponding to a downlink subframe i and receives the PHICH corresponding to the transport block from the downlink subframe i; and the received PHICH is decoded as ACK or the transport block is disabled by the PDCCH transmitted from the downlink subframe i, the UE transmits the ACK corresponding to the transport block to an upper layer. Otherwise, the UE transmits NACK with respect to the transport block to the upper layer.

From the viewpoint of the UE, the ACK/NACK response (or PHICH) with respect to the uplink transmission through the PUSCH of the UE at the n-th uplink subframe is transmitted to the eNB according to the corresponding uplink subframe index at the (n+k)-th downlink subframe which corresponds to the uplink subframe index. In the case of subframe bundling, the corresponding PHICH corresponds to the last subframe of the bundle. The UE should be able to predict that the eNB will transmit at the (n+k)-th downlink subframe a PHICH response with respect to the PUSCH that the UE has transmitted and has to search for/detect/demodulate the corresponding PHICH accordingly. At this time, the k value follows as shown in Table 21.

Table 21 shows a transmission timing relationship of the PUSCH and the PHICH corresponding to the PUSCH according to uplink-downlink configurations.

TABLE 21

| TDD UL/DL Config- | subframe index n | | | | | | | | | |
|---|---|---|---|---|---|---|---|---|---|---|
| uration | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

The PHICH resources are identified by an index pair such as $(n_{PHICH}^{group}, n_{PHICH}^{seq})$. $n_{PHICH}^{group}$ represents the PHICH group number; and $n_{PHICH}^{seq}$ represents an orthogonal sequence index within the corresponding PHICH group. $n_{PHICH}^{group}$ and $n_{PHICH}^{seq}$ can be obtained by Eq. 11 as follows.

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA}/N_{PHICH}^{group} \rfloor + n_{DMRS}) \bmod 2N_{SF}^{PHICH}, \qquad [\text{Eq. 11}]$$

where $n_{DMRS}$ is mapped from the cyclic shift for the DMRS field through the most recent PDCCH having the uplink DCI format intended for a transport block related to the transmission of the corresponding PUSCH. On the other hand, in the case of absence of the PDCCH having the uplink DCI format for the same transport block, the initial PUSCH for the same transport block is scheduled semi-persistently or $n_{DMRS}$ is set to 0 if the initial PUSCH is scheduled by a random access response approval signal.

$N_{SF}^{PHICH}$ represents the size of a spreading factor used for PHICH modulation.

$I_{PRB\_RA}$ gives the same index as $I_{PRB\_RA}^{lowest\_index}$ when $I_{PRB\_RA}$ indicates the first transport block of the PUSCH related to the PDCCH, or when there is no related PDCCH and the number of transport blocks specified manually is not the same as the number of transport blocks specified by the most recent PDCCH related to the corresponding PUSCH. On the other hand, in case $I_{PRB\_RA}$ indicates the second transport block of the PUSCH related to the PDCCH, $I_{PRB\_RA}$ returns the same index as the $I_{PRB\_RA}^{lowest\_index}+1$. At this time, $I_{PRB\_RA}^{lowest\_index}$ corresponds to the lowest PRB index of the first slot for the transmission of the corresponding PUSCH.

$N_{PHICH}^{group}$ represents the number of a PHICH group formed by an upper layer.

$I_{PHICH}$ is 1 if the UE transmits the PUSCH at the subframe index 4 or 9 for the case of uplink-downlink configuration 0 of the TDD system; otherwise, 0.

Table 22 shows a mapping relationship between the cyclic shift for the DMRS field used for determining the PHICH resources through the PDCCH having the uplink DCI format and $n_{DMRS}$.

TABLE 22

| Cyclic Shift for DMRS Field in PDCCH with uplink DCI format | $n_{DMRS}$ |
| --- | --- |
| 000 | 0 |
| 001 | 1 |
| 010 | 2 |
| 011 | 3 |
| 100 | 4 |
| 101 | 5 |
| 110 | 6 |
| 111 | 7 |

In what follows, to described a method for minimizing control plane latency of a UE in the 5G system (or future IMT-advanced system), technical details related to a definition of a contention-based PUSCH zone (hereinafter, it is called a 'CP zone'), a method for setting a CP zone, and a method for using a CP zone will be given with reference to related drawings.

Definition and Configuration of CP Zone

FIG. 25a shows one example of configuring a CP zone, and FIG. 25b illustrates one example of a contention PUSCH resource block (CPRB) constituting a CP zone.

First, a CP zone refers to a region where the UE can transmit UL data directly without scheduling of resource allocation from the eNB with respect to transmission of uplink data of the UE.

The CP zone can be used primarily for the UE to transmit UL data requiring low latency.

With reference to FIG. 25a, 1010 corresponds to a resource region to which the PUCCH is transmitted, and 1020 corresponds to the CP zone.

The CP zone can be allocated to a particular resource area within the PUSCH region to which the UL data can be transmitted. In other words, the CP zone can be allocated to one subframe or one or more consecutive subframes, and the CP zone may not be allocated to a particular subframe.

FIG. 25b represents a CPRB, and a CP zone can consist of one or more CPRBs.

A CPRB represents a resource region that a UE can occupy within a CP zone. One CPRB 1030 is mapped to one UE, but a plurality of CPRBs can be mapped to one UE based on capability of the UE, the amount of UL data that the UE transmits, and so on. Similarly, a plurality of UEs may share one CPRB.

As shown in FIG. 25b, N (where N is a natural number) CPRBs can be defined within a CP zone.

As one example, suppose 3 UEs (UE 1, UE 2, UE 3) share one CP zone and 4 CPRBs (CPRB #1, CPRB #2, CPRB #3, CPRB #4) comprise the CP zone. In this case, CPRB #1 can be allocated to the UE 1; CPRB #2 to the UE 2; and CPRB #3 to the UE 3.

At this time, the eNB may configure the CPRBs to be allocated to the respective UEs. In case the UEs receive CPRB-related information of a CP zone from the eNB, each UE may request the eNB to allocate the CPRB desired by the UE.

Also, in the case of a small cell where the number of UEs (or users) that a cell can accommodate is limited, the eNB may map the CPRB 1-to-1 to the UE when the CPRBs are allocated to the respective UEs.

For example, in case the maximum number of UEs that a small cell can accommodate is N, the eNB of the small cell pre-allocates a CP zone for the N UEs and prevents those UEs beyond the predetermined number N from entering the cell so that the CPRBs can be mapped 1-to-1 to the UEs within the cell.

If the RACH procedure employs the 1-to-1 mapping between the UEs and the CPRBs after a UE enters a cell, a CPRB allocation method is decided implicitly between the UE and the eNB before the UE enters the cell. In other words, in case the UE connected to a macro cell adds a connection to a small cell through dual connectivity, the CPRBs can be allocated beforehand to the UE through a backhaul interface between the small cell and the macro cell.

At this time, dual connectivity refers to the technology such as anchor-booster, carrier aggregation, and simultaneous multi-RAT communication.

In other words, a UE located within a cell having a CP zone can transmit UL data that require low latency transmission directly to the eNB through the CP zone without using the eNB's scheduling (without an UL grant) for transmission of the UL data.

When it comes to the UE's transmission of UL data that requires low latency, it is preferable to use a CP zone for wide applications; however, a CP zone may be used restrictively only for the UL data (as one example, an RRC request message and/or a NAS request message in a random access procedure, BSR transmission in a BSR procedure, and so on) transmitted within a particular procedure.

As shown in FIG. 26, a CP zone may be set up differently according to individual procedures.

A CP zone can be defined to consist of one or more zones depending on its objective. For example, a CP zone area defined for the RACH procedure can be different from the CP zone area defined for the BSR procedure. In other words, CP zones defined on the basis of different objectives can be formed in the respective subframes different from each other or can be formed on different resource blocks within the same subframe.

FIG. 26 illustrates that a CP zone meant for the RACH procedure is set differently from the CP zone intended for a different procedure such as the BSR procedure.

Method for Transmitting CP Zone-Related Information

FIG. 27 illustrates one example of a method for transmitting information related to a CP zone.

If a CP zone is set up in a particular cell, the eNB (or a particular cell) transmits control information related to a CP zone formed in the particular cell to the UEs (within the particular cell) S2710.

At this time, the particular cell may refer to a small cell such as a femto cell, pico cell, and micro cell; or a macro cell.

The CP zone-related control information includes CP zone set-up notification information indicating whether a CP zone has been formed for the particular cell.

If a CP zone is formed in the particular cell, the CP zone-related control information further includes CP zone set-up information which is related to the information related to setting up the CP zone, such as configuration of the CP zone.

The CP zone set-up information can information about uplink resources in which the CP zone is set up and information related to data transmission that can be transmitted to a CPRB within the CP zone.

The information about uplink resources in which the CP zone is set up may include information of an UL subframe which does not have a CP zone by taking into account resource utilization.

As described above, one CP zone can consist of N (which is a natural number) CPRBs that are occupied by one or more UEs.

The information about uplink resources in which the CP zone is set up can include a value indicating the number (M) of CP zones that an arbitrary UE can attempt to occupy at a particular time point.

At this time, N*M represents the total number of CPRBs that an arbitrary UE can select (or occupy) at a particular time point.

For example, if a CP zone has 4 CPRBs and there are 2 CP zones with the same objective (two CP zones form a CP group), a UE can have a total of 8 (4*2) candidate CPRBs.

The information related to data transmission that can be transmitted to the CPRB can include maximum resource block size for each UE, modulation and coding scheme (MCS) level, initial transmission power reference, and so on.

The CP zone-related control information can be transmitted through a broadcast message or through a unicast message intended for a particular UE.

More specifically, the CP zone-related information can be transmitted in four different ways as shown below; however, it should be noted that the present invention is not limited to the descriptions below but accommodates various other transmission methods.

First, CP zone-related control information can be transmitted to the UE through a master information block (MIB).

The CP zone related control information can be included in the MIB which transmits essential physical layer information.

Second, CP zone-related control information can be transmitted to the UE through an existing SIB-x.

Transmission through SIB-x corresponds to the case where a CP zone is set up for initial network connection; thus, the CP zone-related control information can be transmitted being included in SIB-2.

As one example, in case a CP zone is set up for the RACH procedure, information about the CP zone is added to the SIB-2 to make the UE informed through transmission of a contention based RRC connection request message (for example, 2-step RA) before the UE is connected to a cell that the UE can connect to the cell.

Third, CP zone-related control information can be transmitted to the UE through a new SIB-y.

In other words, in case a CP zone is set up for a procedure after network connection, the CP zone-related control information can be transmitted by defining a new SIB.

At this time, the eNB can transmit information indicating that a cell has to receive new SIB information to the UE by including the information in the MIB, SIB-1, or SIB-2.

Fourth, CP zone-related control information can be transmitted to a particular UE through a new control message according to a unicast scheme.

In case the UE is connected to a cell, the CP zone-related control information is transmitted through a unicast message only to the UE that needs to use a CP zone so that only the particular UE can receive the CP zone-related control information.

In case the UE connects (or enters) to the cell, the UE transmits information about an intent to use a CP zone to the eNB by including the information in a message which is transmitted to the eNB at the time of the UE's connecting to the cell. Thus, the UE can make the eNB transmit CP zone-related control information to the UE through a unicast message.

As described above, the CP zone set-up notification information and the CP zone set-up information may be transmitted to UEs through various forms (SIB, MIB, unicast message, and so on) being included in the CP zone-related control information. Or the CP zone notification information and the CP zone set-up information can be transmitted separately through different messages from each other.

At this time, it should be noted that even if the CP zone set-up notification information and the CP zone set-up information are transmitted separately, they can be transmitted through various forms such as the SIB, MIB, unicast message, and so described above.

CP Zone-based BSR Procedure

In the following, a method for using a CP zone in a BSR procedure will be described in more detail.

FIG. 28 illustrates one example of a method for using a CP zone in a buffer state report (BSR) procedure.

A BSR procedure is an UL resource allocation procedure and can be represented as a scheduling request (SR) procedure.

FIG. 28 shows a method for using a contention-based PUSCH (CP) zone as an UL resource for a BSR message transmission.

As shown in FIG. 28, a BSR is transmitted together with an SR from a subframe which transmits the SR. In other words, the UE transmits the BSR together with the SR to the eNB at 1 TTI (Transmission Timing Interval) S2810.

At this time, it is assumed that transmission of the SR is carried out through the PUCCH according to the ON/OFF keying scheme and PUCCH resources are pre-allocated to each UE.

Also, the UE can employ an SR carrying particular information for a system which uses a 5-step SR method of FIG. 18a and a 3-step SR method of FIG. 18b simultaneously.

As one example, the particular information may denote a non-contention based SR in the case of '0' and a contention-based SR in the case of '1'.

More specifically, the UE transmits an SR through the PUCCH and a BSR through a CP zone together to the eNB at 1 TTI, namely, at the same subframe S2820.

Afterwards, the UE receives an UL grant for transmission of actual data from the eNB.

Then the UE transmits actual data to the eNB by using the received UL grant S2830.

At this time, in order to carry out an UL resource allocation process by using a CP zone, the eNB can first of all transmit the CP zone-related control information.

Since the CP zone-related control information is system-related information, it is preferable to transmit the CP zone-related control information through an SIB, but the CP zone-related control information can be transmitted in various ways, not being limited to the case above.

As described above, in case an UL resource allocation process is carried out by using a CP zone, the UE can request UL resources from the eNB and reduce a time period during which to receive the UL resources from the eNB, thereby reducing the overall procedure latency compared with the UL resource allocation procedure based on normal scheduling by the eNB.

FIGS. 29a to 29c illustrate one example of setting up a CP zone in various ways in case the BSR procedure employs the CP zone.

In case a BSR message is transmitted through a CP zone, the UE can transmit a BSR message along with an SR through the PUCCH resources allocated to the UE.

By doing so, the UE can transmit the SR and the BSR message together by using the resources at the same time point or across consecutive time frames.

FIG. 29a shows one example of a method for setting up an intra-subframe of a CP zone where the SR and the BSR message are transmitted within the same subframe.

In other words, as shown in FIG. 29a, the SR and the BSR message are allocated (TDM/FDM) being assigned to different resources (time domain resources or frequency domain resources) within the same subframe.

FIG. 29b shows one example of a method for setting up an inter-subframe of a CP zone where the SR and the BSR message are transmitted within a neighboring subframe.

In other words, as shown in FIG. 29b, the SR and the BSR message may be allocated being assigned to different TTIs through resources of a neighboring subframe.

The BSR message can be transmitted at the next subframe after SR transmission or at the N-th subframe after SR transmission.

FIG. 29c shows one example of a method for setting up a CP zone by combining the methods of FIGS. 29a and 29b.

In other words, to maximize resource utilization within a cell, the compound method of the intra subframe and the inter subframe methods of FIG. 29c does not set up an SR region or a CP zone resource region in a particular subframe.

With reference to FIG. 29c, an SR is allocated to one subframe, and an SR and a CP zone resource region are allocated together in the next subframe.

At this time, the SR and the CP zone resource region are allocated by using frequency resources different for each other.

In addition to the methods of FIGS. 29a to 29c, a method for setting up an SR region and a method for setting up a resource region of a CP zone can be determined in various ways according to cell-operating techniques.

In what follows, a method for CPRB mapping in a BSR procedure according to an SR PUCCH index will be described.

FIG. 30 illustrates one example of a method for CPRB mapping in a BSR procedure.

FIG. 30 illustrates one example of a method for setting up an SR and a CPRB to be 1-to-1 mapped to each other.

In other words, in case n SRs are allocated in one subframe, the method of FIG. 30 set up a CP zone having n CPRBs.

Two methods can be used for setting up an SR and a CPRB to be mapped 1-to-1 to each other.

(1) A method for selecting a CPRB index in the same manner as done for the PUCCH physical index with respect to an SR.

(2) A method for selecting a CPRB index in the same manner as done for the PUCCH logical index with respect to an SR.

In the second method (2), the PUCCH logical index with respect to an SR denotes a new index obtained by mapping the PUCCH resource index allocated for the SR of the UEs in the corresponding subframe logically starting from 0.

The PUCCH logical index can be transmitted after being newly defined by an SR configuration information element.

FIG. 30a illustrates a method for mapping an SR and a CPRB 1-to-1 to each other in a method for setting up an inter-subframe of a CP zone; and FIG. 30b illustrates a method for mapping an SR and a CPRB 1-to-1 to each other in a method for setting up an intra-subframe of a CP zone.

With reference to FIG. 30a, in case the UE 1 transmits an SR to the eNB through the PUCCH index 3 at a subframe n, the UE 1 transmits a BSR message to the eNB in the next subframe, namely, in the subframe (n+1) by using the CPRB index 3 (#3) which is the same as the PUCCH index 3.

Also, in case the UE 2 transmits an SR to the eNB through the PUCCH index 3 at a subframe (n+2), the UE 2 transmits a BSR message to the eNB in the next subframe, namely, in the subframe (n+3) by using the CPRB index 3 (#3) which is the same as the PUCCH index 3.

With reference to FIG. 30b, in case the UE 1 transmits an SR to the eNB through the PUCCH index 0 at a subframe n, the UE 1 transmits a BSR message to the eNB in the same subframe n by using the CPRB index 0 (#0) which is the same as the PUCCH index 0.

Also, in case the UE 2 transmits an SR to the eNB through the PUCCH index 3 at a subframe n, the UE 2 transmits a BSR message to the eNB in the same subframe n by using the CPRB index 3 (#3) which is the same as the PUCCH index 3.

In the following, another method for mapping between an SR and a BSR CPRB will be described.

In this method, the number of CPRBs is set to be smaller than the number of resources for an SR. In other words, in case n SRs are allocated for one subframe, this method sets up a CP zone with 1 to n−1 CPRBs.

In this case, since the number (x) of CPRBs is smaller than the number (n) of

SRs, there can be a chance for BSR transmission collision.

Therefore, to reduce collision during BSR transmission, the following methods are used so that the UE can implicitly select a CPRS for a BSR message.

(1) A method for a UE to select a CPRB in a random fashion.

(2) A method for a UE to select a CPRB by CPRB index(#)=modulo(UE ID % X).

(3) A method for a UE to select a CPRB by CPRB index(#)=modulo(PUCCH physical index with respect to an SR % X).

At this time, the PUCCH physical index can denote a value corresponding to the PUCCH resource index among SR configuration information elements.

(4) A method for a UE to select a CPRB by CPRB index(#)=modulo(PUCCH logical index with respect to an SR % X).

At this time, the PUCCH logical index denotes a new index obtained by mapping the PUCCH resource index allocated for the SR of the UEs in the corresponding subframe logically starting from 0; the corresponding PUCCH logical index can be transmitted additionally for the UE from an SR configuration information element.

In the method of (2), in case X is set by the value which is not a divisor of n, a particular CPRB is selected much more than others by the UEs; thus, the chances of collision can be further increased.

Therefore, due to this reason, it may be preferable to set X as a divisor of n, but the present invention is not limited to this case.

As one example, in case n=6, it may be preferable to set X to one from among 1, 2, 3, and 6.

In the methods of (2) to (4), X denotes a total number of CPRBs that are occupied by the UE transmitting a BSR message. Also, the X value corresponds to the value received from the eNB through system information.

Given that the number of SRs allocated to an arbitrary subframe PUCCH is n, if the number of CPRBs for BSR transmission corresponding thereto is n or more, the UE does not collide with other UEs at the time of transmitting a BSR message to a CPRB.

However, as described above, if the number of CPRBs corresponding (or being mapped) to n SRs is set to n−1 or less, there can be chances that one or more UEs transmit a BSR message to the eNB at the same time through the same CPRB.

FIG. 31 illustrates one example of collision occurred at the time of BSR transmission due to occupation of the same CPRB.

In the case of FIG. 31, the index (CPRB(#)) of a CPRB that the UE selects can be calculated as modulo (selected SR PUCCH index % X), and FIG. 31 shows the case where X=5.

X denotes a total number of CPRBs that are occupied by the UE transmitting a BSR message. And the X value corresponds to the value received from the eNB through system information.

As shown in FIG. 31, the UE 1 transmits an SR to the eNB through the PUCCH resources corresponding to the PUCCH index 1 and a BSR message to the eNB through the CPRB corresponding to the CPRB #1.

Also, the UE 2 transmits an SR to the eNB through the PUCCH resources corresponding to the PUCCH index 2 and a BSR message to the eNB through the CPRB corresponding to the CPRB #1.

In other words, as the UE 1 and the UE 2 transmit a BSR message to the eNB through the same CPRB, resource collision is occurred in the eNB, where the enB is unable to distinguish BSR messages sent from the UE 1 and the UE 2.

In what follows, described will be a method for recognizing collision between BSR messages and a method for resolving collision in case two or more UEs transmit a BSR message by using the same CPRB resources.

In other words, in the case of collision as two or more UEs transmit a BSR message by using the same CPRB resources, the eNB recognizes the occurrence of collision due to transmission of BSR messages, commands the corresponding UEs to re-transmit the BSR messages, and transmits a BSR UL grant to notify that the corresponding UL grant is resource allocation to request re-transmission of BSR messages.

In other words, once the eNB successfully receives a BSR message of the UE through a CPRB, the eNB transmits an UL grant with respect to actual data to the UE without indication.

However, in case the eNB fails to receive a BSR message though it has receives an SR from two or more UEs through the PUCCH, the eNB transmits an UL grant for the BSR message to the UEs together with BSR UL grant indication which notifies that the corresponding UL grant is intended for BSR transmission.

In what follows, a method for relieving collision due to UEs' occupying the same CPRB will be described in more detail.

In other words, in case UEs transmit the UL data by using the CP zone, described with reference to FIGS. 32 to 34 will be a method for reliving collision during UL data transmission that can occur as the UEs select the same CPRB and collision due to transmission and reception of HARQ ACK/NACK signals during the UL data transmission.

First, described briefly are a method for UL data transmission based on the multi-user (MU)-MIMO scheme and a method for transmitting and receiving an error correction response (HARQ ACK/NACK) defined in the LTE-A system.

In the current version of the LTE-A system, UL data are transmitted on the basis of scheduling of an eNB; therefore, the eNB can know which UE will transmit the UL data through which resources.

In other words, the eNB regards the data transmitted through the PUSCH resources mapped to the UL grant of the PUCCH that the eNB has specified (or allocated) as the UL data transmitted by the UE which has received the corresponding UL grant.

In case the UE transmits UL data to the eNB by using the MU-MIMO scheme, two or more UEs can transmit disparate data to the eNB by using the same time and/or frequency resources.

At this time, in order to receive the disparate UL data transmitted through the same resources by the UEs, the eNB allocates a DMRS separately for each UE to receive individual channel information of the UL data transmitted by the UEs and successfully decodes the UL data transmitted by the respective UEs.

Also, the eNB transmits the HARQ ACK/NACK about the UL data successfully received from the UEs to the respective UEs through the PHICH resources mapped to the PUSCH resources scheduled by the eNB.

The eNB allocates cyclic shifts meant for individual DMRSs to two or more UEs having the same lowest PRB index; thus, the corresponding UEs are enabled to transmit ACK/NACK signals by using different PHICH resources.

In case radio channel states among two or more UEs (for example, $H_0, H_1, \ldots, H_n$) are not orthogonal to each other, the eNB may not be able to properly receive the UL data that the UEs transmit through the same resources.

However, if radio channel states among two or more UEs (for example, $H_0, H_1, \ldots, H_n$) are orthogonal to each other, the eNB can successfully receive the UL data transmitted from the two or more UEs even though the UL data are transmitted through the same resources by the two or more UEs.

In case UL data are transmitted through a contention-based PUSCH zone (CP zone), in other words, in case multi-users (a plurality of UEs) transmit uplink data without an UL grant from the eNB, currently no method is defined for providing the eNB with information (for example, DMRS for individual UL data) with which to successfully decode multi-UL data of the UEs transmitted through the same CPRB resources.

Also, even if the eNB successfully receives disparate UL data of individual UEs transmitted through the same CPRB resources, since no method is defined for providing resource information of an error correction response (HARQ ACK/NACK) with respect to the UL data of individual UEs, currently UEs are unable to check errors during UL data transmission.

Therefore, in what follows, a method for transmitting and receiving UL data successfully by using the same CPRB resources of a CP zone and a method for transmitting and receiving the HARQ ACK/NACK signal according to the present invention will be described.

For successful transmission and reception of UL data transmitted without an UL grant (the UL data transmitted through a CP zone), the present invention provides a method for setting a cyclic shift value according to particular methods and using the cyclic shift value for setting up CPRB/DMRS and resources (for example, PHICH) for error correction responses (HARQ ACK/NACK).

FIG. 32 illustrates one example of a method for setting a DMRS cyclic shift of a CPRB according to the present invention.

In case UL data are transmitted directly through a CP zone without receiving an UL grant from the eNB, the UE is unable to receive a DMRS CS value transmitted through the UL grant. Thus, the present invention provides a method for setting a DMRS CS based on CPRB indication information, as shown in FIG. 32.

In other words, as shown in FIG. 32, the UE is unable to receive a DMRS CS value since the UE transmits UL data through a CP zone, where the DMRS CS value is used with respect to the CPRBs selected according to a predetermined rule. Now, the UE maps the DMRS CS value according to CPRB indication information (for example, CPRB indicator) so that resource collision among UEs selecting the same CPRB resources can be avoided.

At this time, resource collision refers to the concept including both resource collision among disparate data transmitted through the same resources and collision of resources for an error correction response (PHICH) in response to the aforementioned resource collision.

The CPRB indication information refers to a signal transmitted through the PUSCH or the PUCCH or a sequence and can be used as an identifier for identifying a particular UE and/or data transmitted through the same (or consecutive) subframe(s) with the CPRBs.

In other words, the CPRB indication information can be (1) a randomly selected preamble sequence of the RACH procedure, (2) a pre-allocated preamble sequence at the time of handover (HO), (3) particular resource index (physical index or logical index) with respect to the PUCCH SR at the time of transmission of an SR, (4) a particular sequence using resources newly defined for an CPRB, an index, or a code value.

Also, the CPRB indication information can be represented in the form of a CPRB indicator.

From now on, the CPRB indication information will be described in more detail.

As shown in FIG. 32, UE 1 and UE 2 transmit UL data to the eNB through a CPRB along with CPRB indication information S3210.

The UE 1 and the UE 2 use different CPRB indication information from each other and select the same CPRB.

DMRS CS values different from each other are allocated implicitly to the respective UEs according to a predetermined rule on the basis of the CPRB indication information.

In other words, each UE and the eNB are now enabled to implicitly calculate different DMRS CS values according to a predetermined rule based on the CPRB indication information.

Through the operation above, the eNB can identify the UL data of the UE 1 from the UL data of the UE 2, all of which are transmitted through the same CPRB and allocate different PHICH resources to the UL data of the respective UEs.

The method for allocating different DMRS CSs according to a predetermined rule will be described in more detail with reference to FIGS. 33 and 34.

The eNB allocates different DMRS CSs to the UE 1 and the UE 2, thereby allocating different PHICH resources to the respective UEs. And the eNB transmits to each UE the HARQ ACK/NACK with respect to UL data transmission performed by the corresponding UL through the allocated PHICH resources S3220.

FIG. 33 illustrates one example of a method for setting a DMRS cyclic shift value according to the present invention.

In case UL data are transmitted through a CP zone, a method for preventing collision during transmission of UL data through the same CPRB resources and a method for mapping DMRS CS values used for transmission of HARQ ACK/NACK signals may be employed; and the UE and the eNB can implicitly calculate the DMRS CS values through the methods.

In other words, the CS value assigned to a particular UE can be calculated by the following Eq. 12.

$$\text{CS for a UE} = [(\text{CPRB indicator value} - \text{CPRB index})/N], \quad [\text{Eq. 12}]$$

where N represents a total number of CPRBs within a CP zone, and CPRB index corresponds to CPRB indication information (CPRB indicator) divided by N (CPRB indicator value % N), having an integer value such that $0 \leq \text{CPRB index} < N$.

In the LTE-A system, the CS value mapped to the DMRS is an integer belonging to the range of $0 \leq \text{CS} \leq 7$ and can take a total of 8 values.

In other words, through the Eq. 12, with respect to the same CPRB selected by different UEs, different CS values as many as $0 < (\text{the maximum value of the CPRB indicator} + 1)/N > -1$ can be set up.

For example, if the maximum value of the CPRB indicator value is 9 and N is 4, different cyclic shift values ranging from 0 to 2 are set up according to Eq. 12.

At this time, 2 is calculated from the equation, $2 = <(9+1)/4> - 1$, and $<>$ stands for a rounded up value, where, for example, $<2.5>$ returns 3.

As shown in FIG. 33, suppose the CPRB indicator values are given by 0, 1, 2, 3, 4, 5, 6, 7, 8, 9, 10, 11, 12, 13, 14, 15 and a total number of CPRBs within a CP zone (N) is 4.

Then the CPRB index is set up as 0, 1, 2, 3, 0, 1, 2, 3, 0, 1, 2, 3, 0, 1, 2, 3 (which is obtained as the remainder of the CPRB indicator divided by N).

Therefore, the CS determined according to Eq. 12 has the value of 0, 0, 0, 0, 1, 1, 1, 1, 2, 2, 2, 2, 3, 3, 3, 3.

At this time, it is assumed that different values are assigned to the CPRB indicator values for the respective UEs.

As described above, even if the UEs have the same CPRB index (the UE having a CPRB indicator value of 0 and the UE having a CPRB indicator value of 4 have the same CPRB index of 0), different cyclic shift values are allocated to the individual UEs according to Eq. 12. Therefore, collision due to transmission of UL data through the same CPRB can be avoided, and accordingly, the HARQ ACK/NACK with respect to the UL data transmitted by the UEs can be transmitted separately to the respective UEs.

In other words, in case the UEs select CPRB indicator values all different from each other, the UEs select particular CPRBs individually by receiving from the eNB CPRB indicator values all different from each other, or the UEs set up DMRS CS values with respect to CPRBs through Eq. 12, a total of 8N (which corresponds to the case where a maximum number of CS values is 8) data can be transmitted orthogonally through N CPRBs.

At this time, the (ideally) maximum number of UL data that can be transmitted orthogonally according to the number of CS values (NCS) can be determined as NCS*N.

If the maximum number of CS values is 8 and the CPRB indicator has a range larger than 8N, there are chances for collision during transmission of UL data performed by two or more UEs and collision during transmission and reception of error correction responses since, as shown in FIG. 33, the same cyclic shift value can be set up according to the same CPRB even if different CPRB indicator values are set to two or more UEs. Therefore, it is preferable that the range of the CPRB indicator value is restricted not to have a value larger than 8N.

FIG. 34 illustrates another example of a method for setting a DMRS cyclic shift value according to the present invention.

FIG. 34 illustrates the case where a CS values is determined simply on the basis of a CPRB indicator value. Different from FIG. 33, the method of FIG. 34 is preferable for the case where the CPRG indicator value is not used for setting up the CPRB index.

In other words, the DMRS CS value allocated with respect to a particular UE can be calculated through the following Eq. 13.

$$\text{CS for a UE} = \text{CPRB indicator value} \ \% \ \text{NCS}, \quad [\text{Eq. 13}]$$

where NCS represents the maximum value of the CS+1, namely, a total number of CS values.

As one example, in the LTE-A system, the CS value ranges from 0 to 7; thus, NCS becomes 8.

As shown in FIG. 34, suppose the CPRB indicator values are given by 0, 1, 2, 3, 4, 5, 6, 7, 8, 9, 10, 11, 12, 13, 14, 15 and NCS value is 8. Then the DMRS CS value with respect to the CPRB becomes 0, 1, 2, 3, 4, 5, 6, 7, 0, 1, 2, 3, 4, 5, 6, 7, respectively.

In the case of a method for setting up a DMRS CS value with respect to a CPRB through a method of FIG. 34, the number of CSs used is increased according to the number of UEs; therefore, the usage for radio resources in the LTE-A system can be increased accordingly.

As a yet another embodiment, the DMRS CS value with respect to the CPRB may be set up through a UE ID.

In other words, by setting up a DMRS CS with respect to a CPRB by using a CPRB indicator value and a UE ID, resource collision (collision of UL data transmission and collision of HARQ ACK/NACK signals) due to selection of the same CPRB can be prevented.

Overview of an Apparatus to which the Present Invention can be Applied

FIG. 35 illustrates a block diagram of a wireless communication device to which the present invention can be applied.

With reference to FIG. 35, a wireless communication system comprises an eNB 3510 and a plurality of UEs 3520 located within the coverage of the eNB 3510.

An eNB 3510 comprises a processor 3511, a memory 3512, and a radio frequency (RF) unit 3513. The processor 3511 implements a function, process and/or method propose through FIGS. 1 to 34. Layers of radio interface protocols can be implemented by the processor 3511. The memory 3512, being connected to the processor 3511, stores various types of information to operate the processor 3511. The RF unit 3513, being connected to the processor 3511, transmits and/or receives a radio signal.

A UE 3520 comprises a processor 3521, a memory 3522, and a radio frequency (RF) unit 3523. The processor 3521 implements a function, process and/or method propose through FIGS. 1 to 34. Layers of radio interface protocols can be implemented by the processor 3521. The memory 3522, being connected to the processor 3521, stores various types of information to operate the processor 3521. The RF unit 3523, being connected to the processor 3521, transmits and/or receives a radio signal.

The memory 3512, 3522 can be located inside or outside the processor 3511, 3512 and can be connected to the processor 3511, 3521 through a well-known means.

The eNB 3510 and/or the UE 3520 can have a single antenna or multiple antennas.

The embodiments described above are a combination of constituting elements and features of the present invention in particular forms. Unless otherwise specified, each constituting element or feature should be regarded to be selective. Each constituting element or feature can be embodied solely without being combined with other constituting element or feature. It is also possible to construct embodiments of the present invention by combining part of constituting elements and/or features. The order of operations illustrated in the embodiments of the present invention can be changed. Part of a structure or feature of an embodiment can be included by another embodiment or replaced with the corresponding structure or feature of another embodiment. It should be clear that embodiments can also be constructed by combining those claims revealing no explicit reference relationship with one another, or the combination can be included as a new claim in a revised application of the present invention afterwards.

Embodiments according to the present invention can be realized by various means, for example, hardware, firmware, software, or a combination thereof. In the case of hardware implementation, the embodiments of the present invention can be implemented by one or more of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, and the like.

In the case of firmware or software implementation, methods according to the embodiment of the present invention can be implemented in the form of a module, procedure, or function carrying out operations described above. Software codes can be stored in a memory unit and executed by a processor. The memory unit, being located inside or outside the processor, can communicate data with the processor through various means known in the fields of the art.

It should be clearly understood by those skilled in the art that the present invention can be realized in a different, particular form as long as the present invention retains the essential features of the present invention. Therefore, the detailed description above should not be interpreted limitedly from all aspects of the invention but should be regarded as an illustration. The technical scope of the invention should be determined through a reasonable interpretation of the appended claims; all the possible modifications of the present invention within an equivalent scope of the present invention should be understood to belong to the technical scope of the present invention.

INDUSTRIAL APPLICABILITY

This document discloses a method for requesting scheduling for uplink data transmission in a wireless communication system with examples based on the 3GPP LTE/LTE-A system; however, the present invention can be applied to various other types of wireless communication systems in addition to the 3GPP LTE/LTE-A system.

The invention claimed is:

1. A method for transmitting, by a user equipment (UE), uplink (UL) data in a wireless communication system, the method comprising:
   transmitting, to an evolved Node B (eNB), contention physical uplink shared channel (PUSCH) resource block (CPRB) indication information used for identifying the UL data;
   transmitting, to the eNB, the UL data through one or more CPRB resources of a contention based PUSCH (CP) zone; and
   receiving, from the eNB, a hybrid automatic retransmit request (HARQ) response with respect to the UL data through a physical hybrid ARQ indicator channel (PHICH),
   wherein the CP zone is a resource area from which UL data is transmitted without allocation of an UL grant,
   wherein the UL data transmitted by the UE is identified by a specific cyclic shift (CS), and
   wherein the specific CS is determined by using a value of the CPRB indication information, a CPRB index and a total number of CPRBs included in the CP zone.

2. The method of claim 1, wherein the CPRB indication information is a signal transmitted through a physical uplink shared channel (PUSCH) or a physical uplink control channel (PUCCH).

3. The method of claim 1, wherein a value of the specific CS is determined through the following equation:

$$CS\ value = \left[\frac{CPRB\ \text{indication information value} - CPRB\ \text{index}}{A\ \text{total number of}\ CPRBs(N)}\right].$$

4. The method of claim 1, wherein the CPRB index is given by a remainder of the value of CPRB indication information divided by the total number of CPRBs (N).

5. The method of claim 4, wherein the value of the specific CS ranges from 0 to <(the maximum value of the CPRB indication information value+1)/N>−1 for the same CPRB.

6. The method of claim 1, wherein the PHICH is assigned for each UE according to the specific CS.

7. The method of claim 1, wherein the CPRB indication information and the UL data are transmitted from the same subframe or through consecutive subframes.

8. A method for receiving, by an evolved Node B (eNB), uplink (UL) data in a wireless communication system, the method comprising:
   receiving, from at least two or more user equipments (UE), contention physical uplink shared channel (PUSCH) resource block (CPRB) indication information used for identifying UL data;
   receiving, from the at least two or more UEs, UL data through CPRB resource of a contention based PUSCH (CP) zone; and
   transmitting, to the at least two or more UEs, a hybrid automatic retransmit request (HARQ) response with respect to the UL data through a physical hybrid ARQ indicator channel (PHICH),
   wherein the CP zone is a resource area from which UL data is transmitted without allocation of an UL grant,
   wherein the UL data transmitted by the UE is identified by a specific cyclic shift (CS), and
   wherein the specific CS is determined by using a value of the CPRB indication information, a CPRB index and a total number of CPRBs included in the CP zone.

9. A user equipment for transmitting uplink (UL) data in a wireless communication system, comprising:
   a radio frequency (RF) unit for transmitting and receiving a radio signal; and
   a processor,
   wherein the processor is controlled:
      to transmit, to an evolved Node B (eNB) contention physical uplink shared channel (PUSCH) resource block (CPRB) indication information used for identifying the UL data;
      to transmit, to the eNB, UL data through one or more CPRB resources of a contention based PUSCH (CP) zone; and
      to receive, from the eNB, a hybrid automatic retransmit request (HARQ) response with respect to the UL data through a physical hybrid ARQ indicator channel (PHICH); and
   wherein the CP zone is a resource area from which UL data is transmitted without allocation of an UL grant
   wherein the UL data transmitted by the UE is identified by a specific cyclic shift (CS), and
   wherein the specific CS is determined by using a value of the CPRB indication information, a CPRB index and a total number of CPRBs included in the CP zone.

* * * * *